(12) United States Patent
Saitoh et al.

(10) Patent No.: US 11,733,733 B2
(45) Date of Patent: Aug. 22, 2023

(54) STRAP

(71) Applicant: PANASONIC INTELLECTUAL PROPERTY MANAGEMENT CO., LTD., Osaka (JP)

(72) Inventors: Eiji Saitoh, Kanagawa (JP); Shinji Tomobe, Kanagawa (JP); Masami Tatehana, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 55 days.

(21) Appl. No.: 17/559,535

(22) Filed: Dec. 22, 2021

(65) Prior Publication Data
US 2022/0334613 A1    Oct. 20, 2022

(30) Foreign Application Priority Data

Apr. 14, 2021   (JP) ................................. 2021-068451

(51) Int. Cl.
| A45F 5/10 | (2006.01) |
| G06F 1/16 | (2006.01) |
| A45F 5/00 | (2006.01) |
| H02J 7/00 | (2006.01) |
| H04B 1/3827 | (2015.01) |

(52) U.S. Cl.
CPC .............. *G06F 1/1628* (2013.01); *A45F 5/00* (2013.01); *A45F 2005/002* (2013.01); *A45F 2200/0516* (2013.01); *A45F 2200/0525* (2013.01); *H02J 7/0042* (2013.01); *H04B 1/385* (2013.01)

(58) Field of Classification Search
CPC ........ A45F 2200/0525; A45F 2005/008; A45F 2200/0516; A45F 5/10; A45C 2011/002; A45C 2200/15; H04B 2001/3861; F16M 13/04
USPC ....................................................... 224/218
See application file for complete search history.

(56) References Cited

U.S. PATENT DOCUMENTS

2020/0196726 A1* 6/2020 Saitoh .................... A45C 13/30

FOREIGN PATENT DOCUMENTS

| JP | 2019192187 A | * 10/2019 |
| JP | 2020-102812 | 7/2020 |

\* cited by examiner

*Primary Examiner* — Adam J Waggenspack
(74) *Attorney, Agent, or Firm* — Greenblum & Bernstein, P.L.C.

(57) ABSTRACT

A strap includes a base having a plate shape and detachably attached to a terminal rear surface of a portable terminal, a rotary plate attached to a base front surface of the base so as to be rotatable around a rotation axis perpendicular to the base front surface, an annular holding portion fixed to a rotary plate front surface of the rotary plate and into which a palm portion is inserted from a finger, and an adjuster portion having a foldable portion and fixed to the base rear surface of the base. The foldable portion varies a distance perpendicular to the base rear surface from the base rear surface of the base.

14 Claims, 31 Drawing Sheets

FIG. 30

| TYPE OF GADGET | GADGET NOT PRESENT | | GADGET PRESENT | |
|---|---|---|---|---|
| TYPE OF BATTERY | S BATTERY | L BATTERY | S BATTERY | L BATTERY |
| STATE OF ADJUSTER PORTION | DEPLOYED STATE | DEPLOYED STATE | FOLDED STATE | DEPLOYED STATE |

STRAP

CROSS-REFERENCE TO RELATED APPLICATIONS

This application is based on and claims priority under 35 USC 119 from Japanese Patent Application No. 2021-068451 filed on Apr. 14, 2021, the contents of which are incorporated herein by reference.

TECHNICAL FIELD

The present disclosure relates to a strap.

BACKGROUND ART

In a portable terminal, there is known a strap in which, even when a large-capacity battery pack is mounted to a terminal rear surface instead of a normal battery pack, a plate portion attached to the terminal rear surface is bent in a direction toward the terminal rear surface at a fold portion, and thus the plate portion is not bent (see JP-A-2020-102812). According to the strap, a flat state of the plate portion to which a grip portion is rotatably attached can be maintained.

Various optional devices (for example, gadgets) may be installed on the terminal rear surface of the portable terminal. There are a plurality of gadgets having different thicknesses. In the related art, a plurality of types of straps are prepared in correspondence with the gadgets having different thicknesses. However, there is a demand for a single type of strap in order to reduce the number of components and facilitate product management. However, depending on the thickness of the optional device, rotation of the portable terminal in a vertical direction and a horizontal direction may be inhibited. For example, if the optional device is not attached, the thickness of the strap attached to the portable terminal becomes excessively large, and portability may be inhibited. When the rotatable grip portion is attached to a battery mounting position in an overlapping manner, when a thin normal battery pack and a thick large-capacity battery pack are replaced with each other, a level difference is large, and thus inconvenience that inhibits the rotation and the portability may become more remarkable.

SUMMARY OF INVENTION

The present disclosure has been made in view of the above-described situation in the related art. An object of the present disclosure is to provide a strap capable of preventing rotation of a portable terminal in a vertical direction and a horizontal direction from being inhibited, and preventing a thickness of the strap from becoming excessive large even when various electronic components are attached to a terminal rear surface.

According to an aspect of the present disclosure, there is provided a strap including: a base having a plate shape and detachably attached to a terminal rear surface on a side opposite to a terminal front surface on which a display of a portable terminal is provided; a rotary plate attached to a base front surface on a side opposite to a base rear surface of the base facing the terminal rear surface so as to be rotatable around a rotation axis perpendicular to the base front surface; an annular holding portion fixed to a rotary plate front surface on a side opposite to a rotary plate rear surface of the rotary plate facing the base front surface and into which a palm portion is inserted from a finger; and an adjuster portion having a foldable portion and fixed to the base rear surface of the base, and the foldable portion varies a distance perpendicular to the base rear surface from the base rear surface of the base.

According to the present disclosure, even when various electronic components are attached to a terminal rear surface, it is possible to prevent rotation of a portable terminal in a vertical direction and a horizontal direction from being inhibited, and it is possible to prevent a thickness of the strap from becoming excessively large.

BRIEF DESCRIPTION OF DRAWINGS

FIG. 30 is an explanatory diagram of a table for determining a folded state or a deployed state of an adjuster portion in accordance with a type of a battery and presence or absence of the gadget.

DESCRIPTION OF EMBODIMENTS

Hereinafter, an embodiment in which a strap according to the present disclosure is specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy of the following description and to facilitate understanding of those skilled in the art. The attached diagrams and the following description are provided in order for a person skilled in the art to sufficiently understand the present disclosure, and are not intended to limit the matters described in the scope of the claims.

Figure 1:
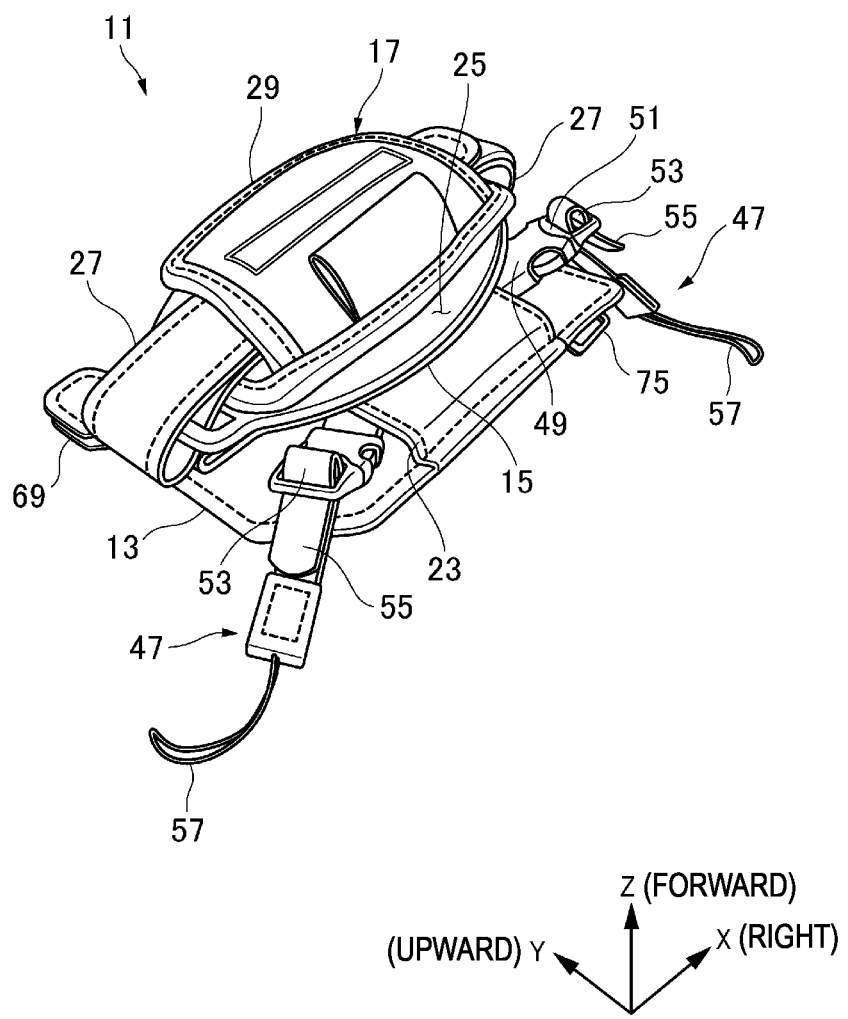
FIG. 1 is a perspective view of a strap according to a first embodiment as viewed obliquely from a forward and downward direction.

FIG. 1 is a perspective view of a strap 11 according to a first embodiment as viewed obliquely from a forward and downward direction. Directions in the present specification follow directions of arrows attached to an X-axis, a Y-axis, and a Z-axis shown in the figure. Here, an X direction indicates a right direction, a Y direction indicates an upward direction, and a Z direction indicates a forward direction. Therefore, although not shown, an —X direction indicates a left direction, a —Y direction indicates a downward direction, and a —Z direction indicates a backward direction. In addition, a circle surrounding a point at an intersection of orthogonal axes indicates a direction in which an arrow is viewed from the front, and a circle surrounding X at an intersection of the orthogonal axes indicates a direction in which the arrow is viewed from the rear.

Figure 4:
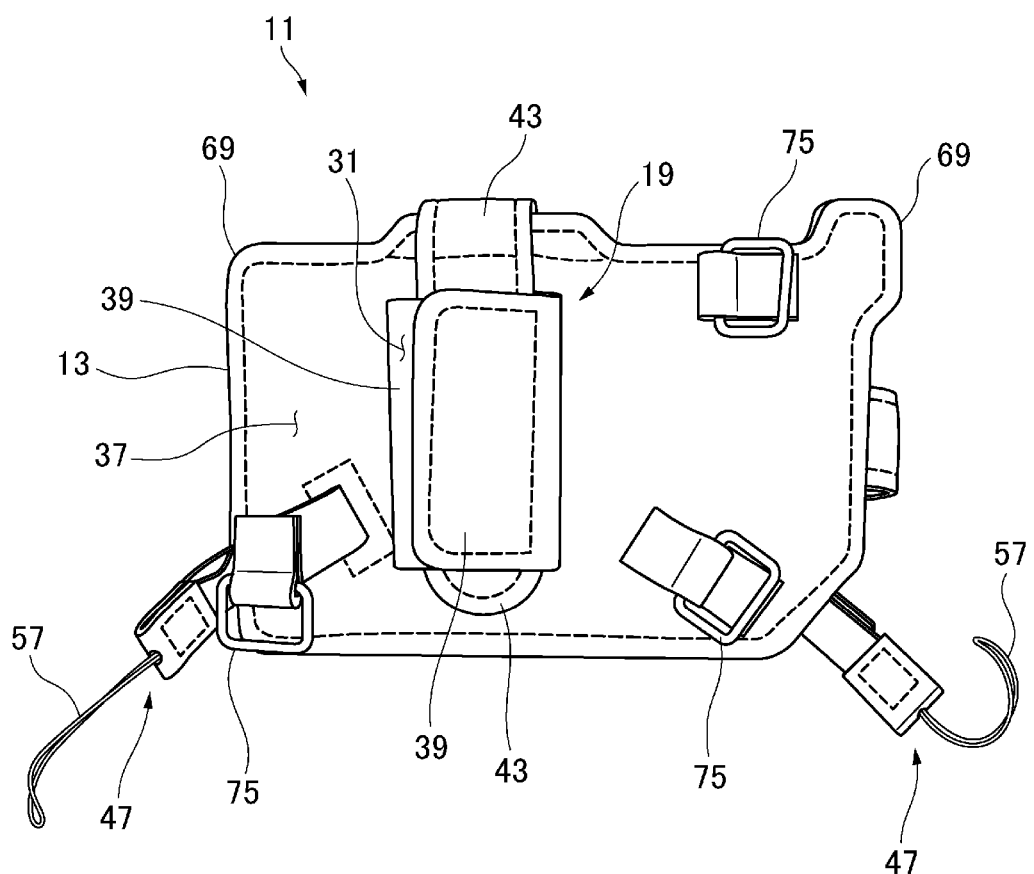
FIG. 4 is a rear view of a base rear surface provided with an adjuster portion.

A strap 11 according to the first embodiment includes, as main components, a base 13, a rotary plate 15, a holding portion 17, and an adjuster portion 19 (see FIG. 4).

Figure 2:
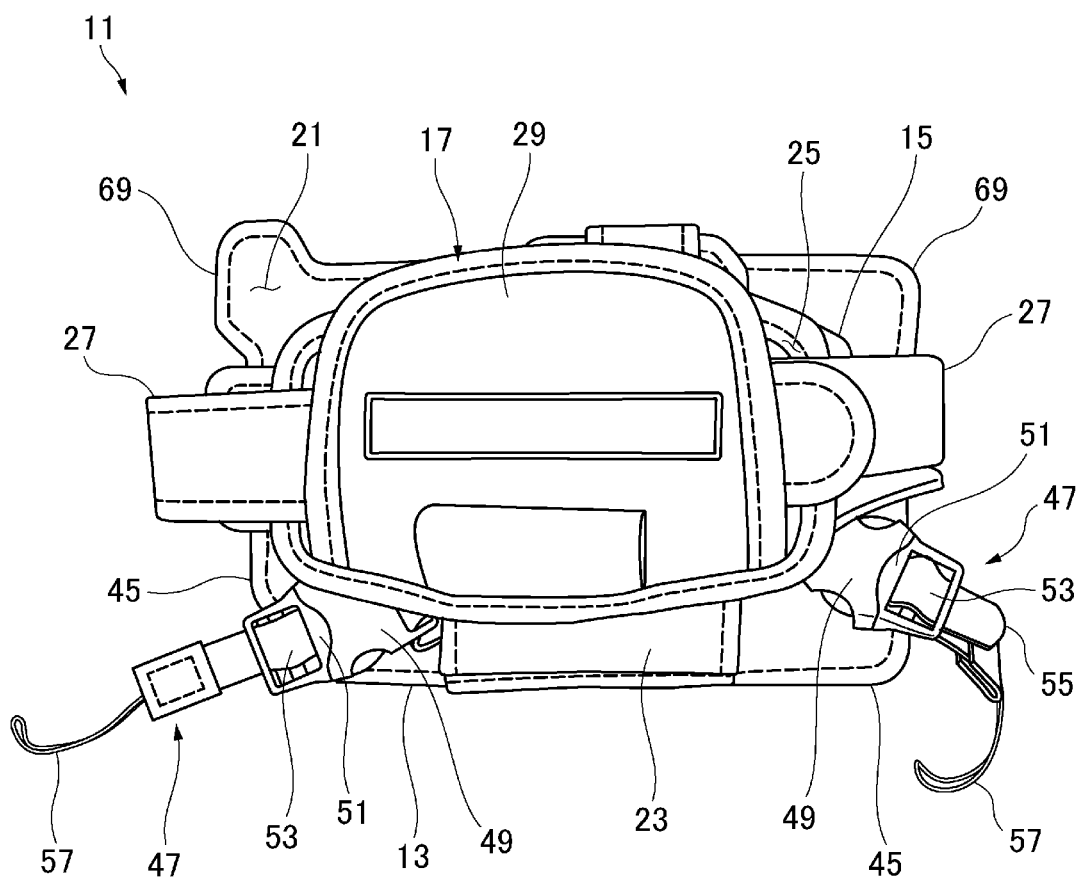
FIG. 2 is a front view of the strap as viewed from the forward direction.

FIG. 2 is a front view of the strap 11 as viewed from the forward direction.

The base 13 has a substantially rectangular plate shape that is long in a left-right direction. The base 13 is made of a skin, a cladding, a cloth, or the like, and is reinforced by inserting a core material or sewing an edge or a main portion. A rectangular rotary plate support mechanism portion 23 that is long in an up-down direction is sewed on a central portion of a base front surface 21. The rotary plate support mechanism portion 23 has a shaft portion (not shown) perpendicular to the base front surface 21 inside a rectangular shape. More specifically, the shaft portion is disposed in the vicinity of an intersection of a pair of diagonal lines of the rectangular shape of the rotary plate support mechanism portion 23. The rotary plate 15 has a substantially elliptical shape that is long in the left-right direction at a normal position shown in FIG. 2. A rotation center of the rotary plate 15 is in the vicinity of the intersection of a long axis and a short axis. The rotation center of the rotary plate 15 is supported by the shaft portion of the rotary plate support mechanism portion 23. Accordingly, the rotary plate 15 is attached so as to be rotatable by 360 degrees around the rotation center (rotation axis) perpendicular to the base front surface 21. The annular holding portion 17 is fixed to a rotary plate front surface 25.

Figure 3:
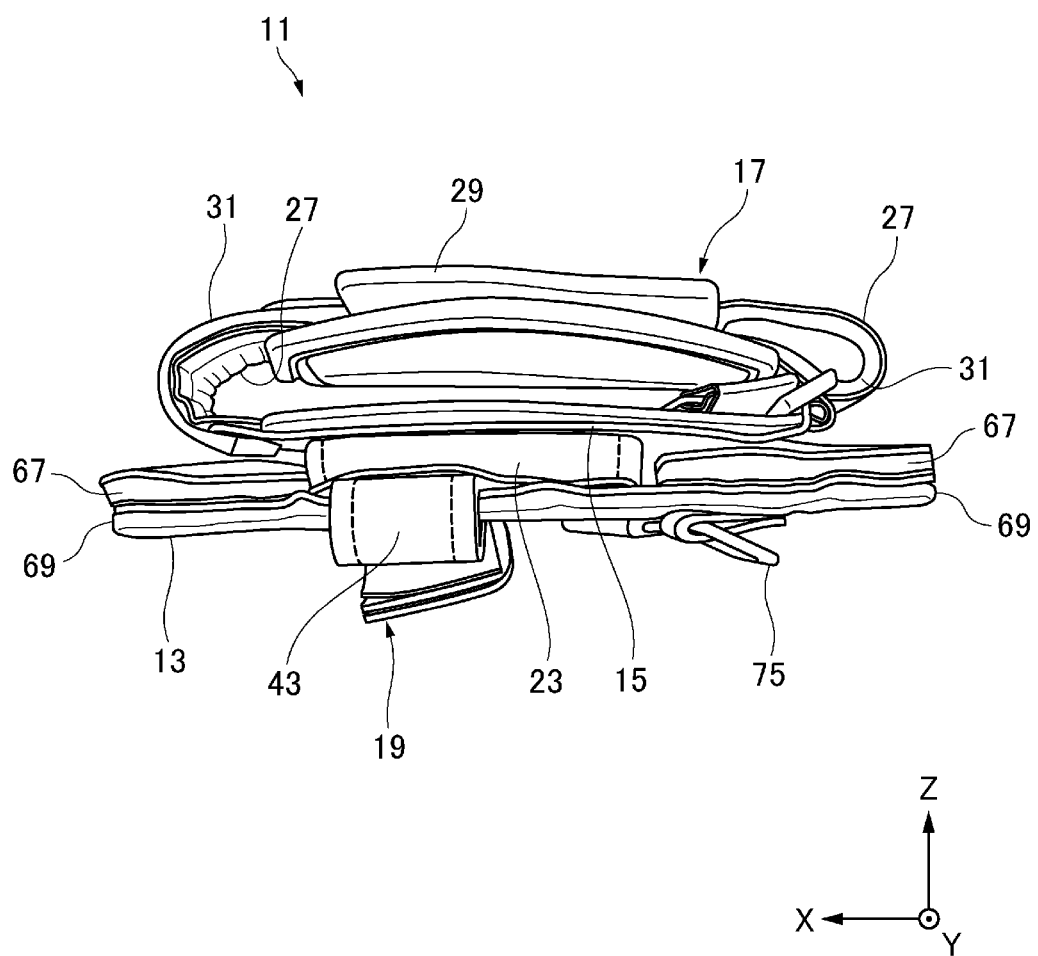
FIG. 3 is a plan view of the strap as viewed from an upward direction.

FIG. 3 is a plan view of the strap 11 as viewed from an upward direction.

The holding portion 17 includes a pair of adjustment belts 27 extending in the left-right direction and a belt cover 29. The pair of adjustment belts 27 are provided with hook-and-loop fasteners 31 that can be released from engagement on one surface and the other rear surface. The hook-and-loop fastener 31 is also provided between the belt cover 29 and the adjustment belts 27. As the hook-and-loop fastener 31, for example, a magic tape (registered trademark) or a bell clamp (registered trademark) in which hook-shaped raised fibers are provided on one side and loop-shaped raised fibers are provided on the other side can be used. The holding portion 17 is set to an annular size suitable for a user who inserts a palm portion 35 from a finger 33 (see FIG. 26) by adjusting engagement positions of the pair of adjustment belts 27 and engaging the belt cover 29 thereon. In the strap 11, the palm portion 35 is inserted into the holding portion 17, and the base 13 is rotated with respect to the rotary plate 15 integrated with the holding portion 17, so that the portable terminal attached to the base 13 is rotated in a vertical direction or a horizontal direction.

FIG. 4 is a rear view of a base rear surface 37 provided with the adjuster portion 19.

The adjuster portion 19, which is folded and is long in the up-down direction, is fixed to a substantially central portion of the base rear surface 37. A distance of the adjuster portion 19 perpendicular to the base rear surface 37 can be changed by folding and deploying a foldable portion of the adjuster portion 19.

Figure 5:
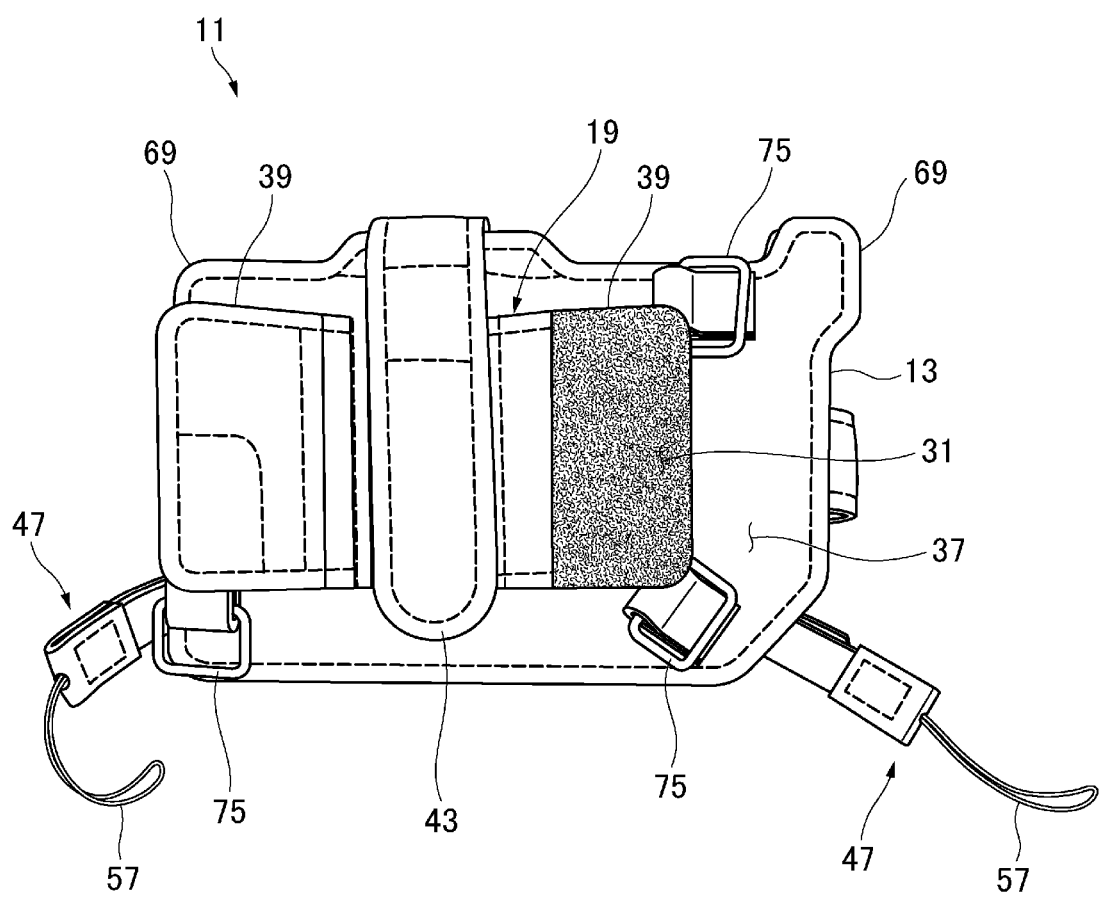
FIG. 5 is a rear view of the base rear surface in a state where a blade portion of the adjuster portion is deployed.

FIG. 5 is a rear view of the base rear surface 37 in a state where a blade portion 39 of the adjuster portion 19 is deployed.

The adjuster portion 19 includes a belt attachment plate 41 (see FIG. 6) fixed to the base rear surface 37, an insertion belt 43 extending in a long length from the base 13, folded back in a substantially half manner, and engaged with and overlapping the belt attachment plate 41, and a pair of blade portions 39 projecting from both sides of the belt attachment plate 41 and alternately folded and engaged on the insertion belt 43. The insertion belt 43 overlapping the belt attachment plate 41 is disposed between the both sides of the belt attachment plate 41. In the pair of blade portions 39, one of the hook-and-loop fasteners 31 is provided on a surface of a right blade portion 39, and the other of the hook-and-loop fasteners 31 is provided on a rear surface of a left blade portion 39. Accordingly, the pair of blade portions 39 are fixed in a form of a laminated body that is long in the up-down direction as shown in FIG. 4 by overlapping the right side of the pair of blade portions 39 with the insertion belt 43 and then further overlapping the left side of the pair of blade portions 39.

Figure 6:
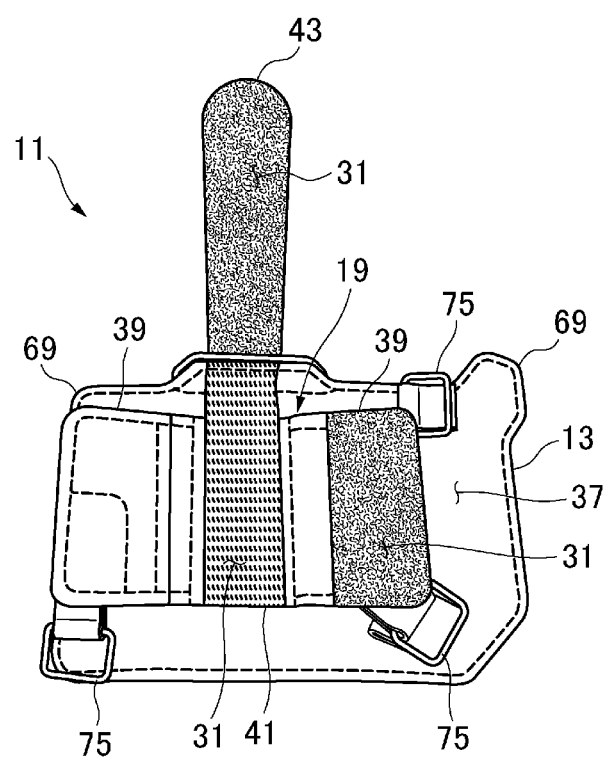
FIG. 6 is a rear view of the base rear surface in a state where an insertion belt is deployed.

FIG. 6 is a rear view of the base rear surface 37 in a state where the insertion belt 43 is deployed.

The insertion belt 43 extends from the base 13 in the upward direction in a long length, and substantially half of the insertion belt 43 in a longitudinal direction is folded back so as to overlap the belt attachment plate 41. One and the other of the hook-and-loop fasteners 31 are provided on opposing surfaces of the belt attachment plate 41 and the insertion belt 43. The insertion belt 43 is inserted into a hole portion provided in a second electronic device (for example, a barcode reader) mounted on the terminal rear surface as an optional device to be described later. The base 13 of the strap 11 is supported at one point on the terminal rear surface by inserting the insertion belt 43 into the hole portion of the optional device mounted to the terminal rear surface. As shown in FIG. 3, a belt base end of the insertion belt 43 is sandwiched and fixed between the base front surface 21 and the rotary plate support mechanism portion 23.

The adjuster portion 19 is provided on a side opposite to the rotary plate support mechanism portion 23 with respect to the base 13 sandwiched therebetween. More specifically, the adjuster portion 19 is disposed on a side opposite to the shaft portion of the rotary plate support mechanism portion 23 with respect to the base 13. The rotary plate support mechanism portion 23 and the adjuster portion 19 are disposed on a straight line perpendicular to the terminal rear surface. A weight caused by abutment of the adjuster portion 19 is transmitted to the shaft portion of the rotary plate support mechanism portion 23. The shaft portion is disposed at a center of the rotary plate support mechanism portion 23. Accordingly, deformation (including distortion such as warpage) of the base 13 due to a pressing force received from the adjuster portion 19 is prevented. As a result, the rotary plate 15 is less likely to be caught by the deformation of the base 13, and the portable terminal can be smoothly rotated.

As shown in FIG. 2, a buckle-attached belt 47 whose length is adjustable is fixed to each of a base lower corner portions 45 on both sides of the base 13. The buckle-attached belt 47 includes a female buckle 49 and a male buckle 51 that can be coupled to and decoupled from the female buckle 49. The male buckle 51 includes a length adjustment portion 53. The length adjustment portion 53 can adjust a length by pulling a belt extra length portion 55 to a side opposite to the female buckle 49 to be coupled. A string ring 57 is fixed to the male buckle 51 on a side opposite to a coupling side with the female buckle 49. The string ring 57 is connected to the portable terminal.

Figure 7:
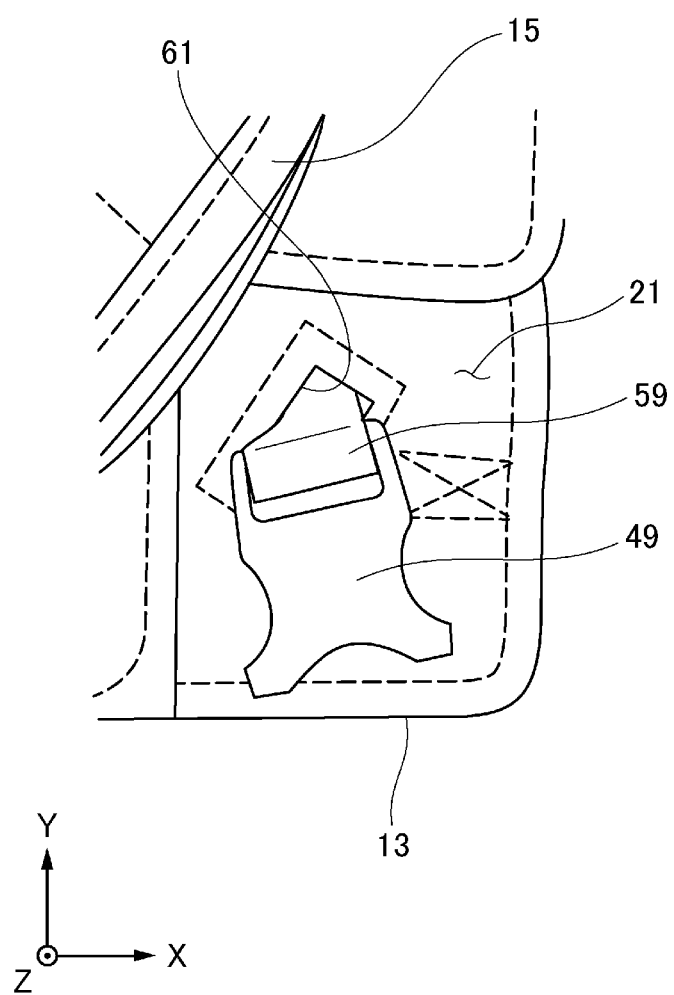
FIG. 7 is an enlarged view of a main part of a female buckle fixed to a base front surface.

FIG. 7 is an enlarged view of a main part of the female buckle 49 fixed to the base front surface 21.

A fixing belt 59 is connected to the female buckle 49 on a side opposite to the coupling side with the male buckle 51. A through hole 61 through which the fixing belt 59 is inserted is formed in the base 13. The fixing belt 59 is inserted into the through hole 61. An insertion tip end side is fixed to the base rear surface 37.

Figure 8:
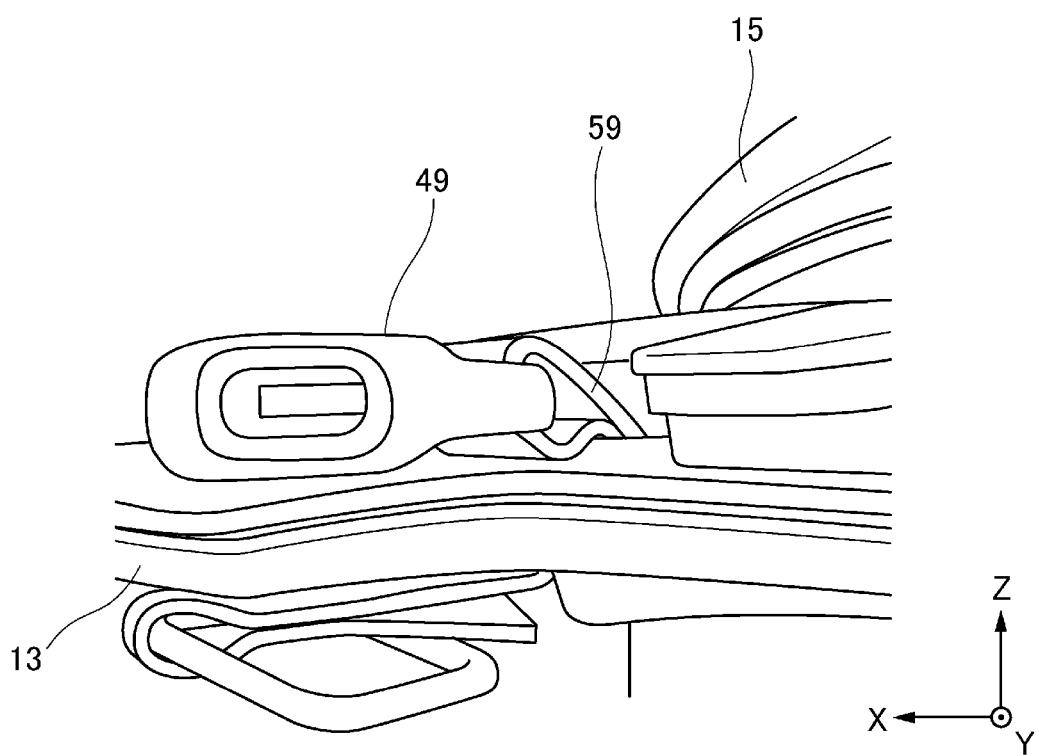
FIG. 8 is a side view of a fixing belt drawn into the base.

FIG. 8 is a side view of the fixing belt 59 drawn into the base 13.

The female buckle 49 eliminates the need to secure a fixing space on the base front surface 21 since the fixing belt 59 passes through the through hole 61 and is fixed to the base rear surface 37. Accordingly, the strap 11 can secure a larger rotation space for the rotary plate 15 on the base front surface 21.

Figure 9:
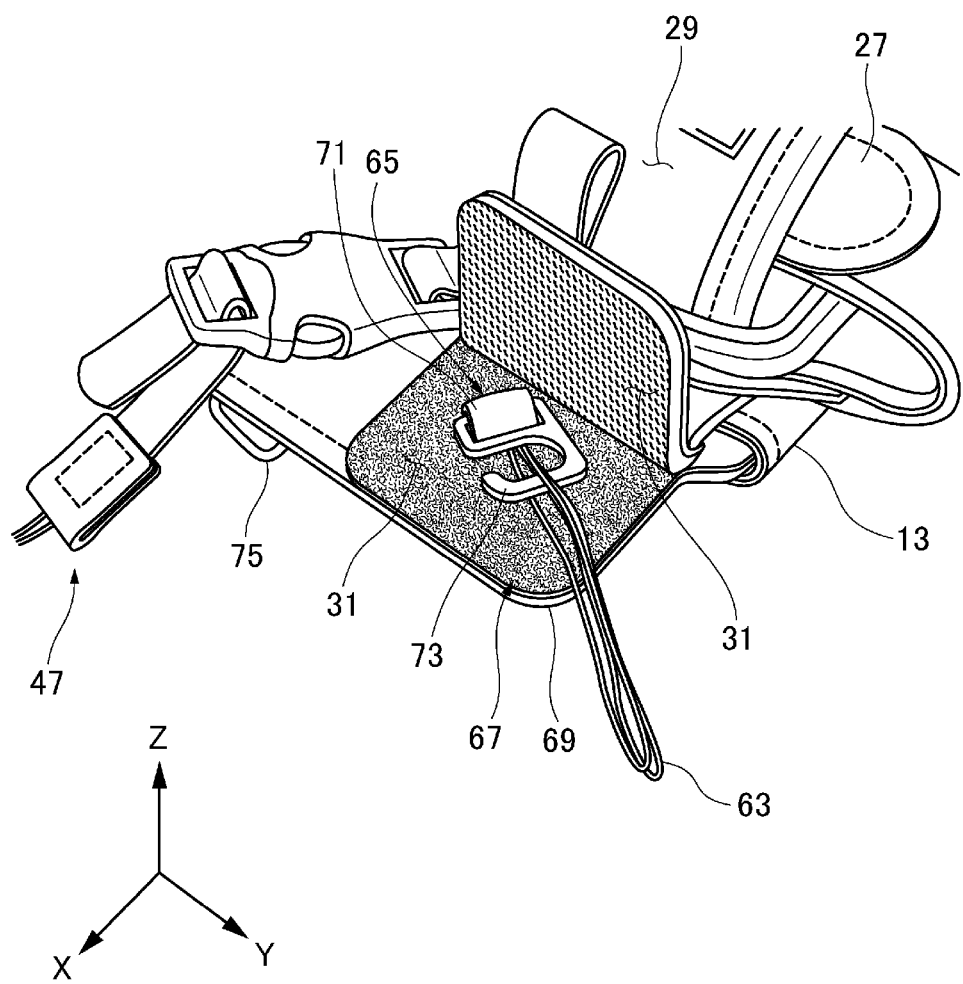
FIG. 9 is a perspective view of an accommodation portion to which a string fixing metal fitting on which a first attachment string is hooked is fixed.

FIG. 9 is a perspective view of an accommodation portion 67 to which a string fixing metal fitting 65 to which a first attachment string 63 is hooked is fixed Each of the base lower corner portions 45 (see FIG. 2) on both sides of the base 13 is fixed to the portable terminal by the above-described buckle-attached belts 47. Accordingly, the base 13 is supported at two points. The string fixing metal fitting 65 shown in FIG. 9 is fixed to base upper corner portions 69 (see FIG. 2) on both sides of the base 13. The base upper corner portion 69 is bonded by the hook-and-loop fastener 31 so as to be separated into two pieces in a thickness direction. In each of the base upper corner portions 69, the string fixing metal fitting 65 is fixed to the separated one hook-and-loop fastener 31. In the base upper corner portions 69 on both sides, the accommodation portion 67 is formed between the two hook-and-loop fasteners that are separated from each other. That is, the string fixing metal fitting 65 is fixed to the accommodation portion 67.

The string fixing metal fitting 65 is formed in, for example, a shape of a numeric character "6". An annular ring portion 71 is fixed to the hook-and-loop fastener 31 by a belt or the like. In the string fixing metal fitting 65, the annular constant-sized first attachment string 63 is hooked on a hook portion 73 connected to the annular ring portion 71. Each of the first attachment strings 63 is fixed to a terminal upper corner portion of the portable terminal. The first attachment string 63 is disposed between the hook-and-loop fasteners 31 opened together with the string fixing metal fitting 65, and can be accommodated in the accommodation portion 67 by closing the hook-and-loop fastener 31.

In this way, the strap 11 is fastened at four points by fixing the base lower corner portions 45 on both sides to the portable terminal by the buckle-attached belts 47 and fixing the base upper corner portions 69 on both sides to the portable terminal by the first attachment strings 63. Further, the strap 11 is fastened at three points by fixing the base lower corner portions 45 on both sides to the portable terminal by the buckle-attached belts 47, and by hooking and fastening the insertion belt 43 of the adjuster portion 19 to the second electronic device mounted to the terminal rear surface. That is, the strap 11 can be fixed to the portable terminal in two ways of three-point fastening and four-point fastening.

As shown in FIG. 4, in the strap 11, a plurality of attachment elements 75 are fixed to the base rear surface 37. In the attachment element 75, for example, a square frame-shaped ring fitting is fixed to the base rear surface 37 by a belt or the like. The attachment elements 75 are disposed, for example, at a total of three locations, that is, the base lower corner portions 45 on both sides and the base upper corner portion 69 on the left side. The attachment element 75 can attach an external support member (a shoulder strap, a neck strap, or the like) that supports the base 13.

Figure 10:
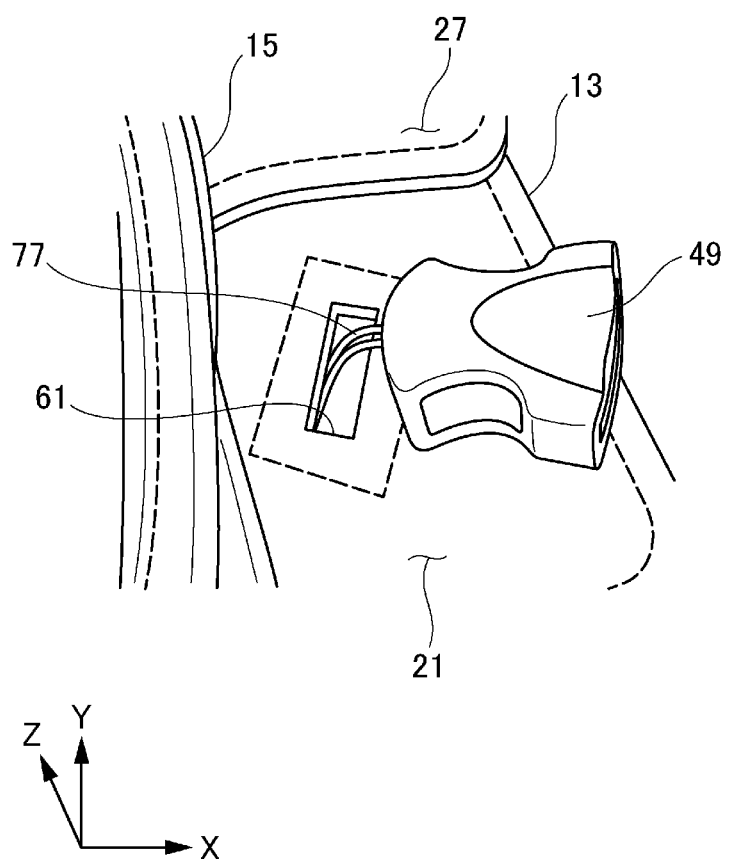
FIG. 10 is an enlarged perspective view of a main part showing a fixing structure of the female buckle according to a modification.

FIG. 10 is an enlarged perspective view of a main part showing a fixing structure of the female buckle 49 according to a modification.

The buckle-attached belt 47 may fix the female buckle 49 to the base 13 by a second attachment string 77. Also in this case, similarly to the fixing belt 59, the second attachment string 77 passes through the through hole 61 formed in the base 13.

Figure 11:
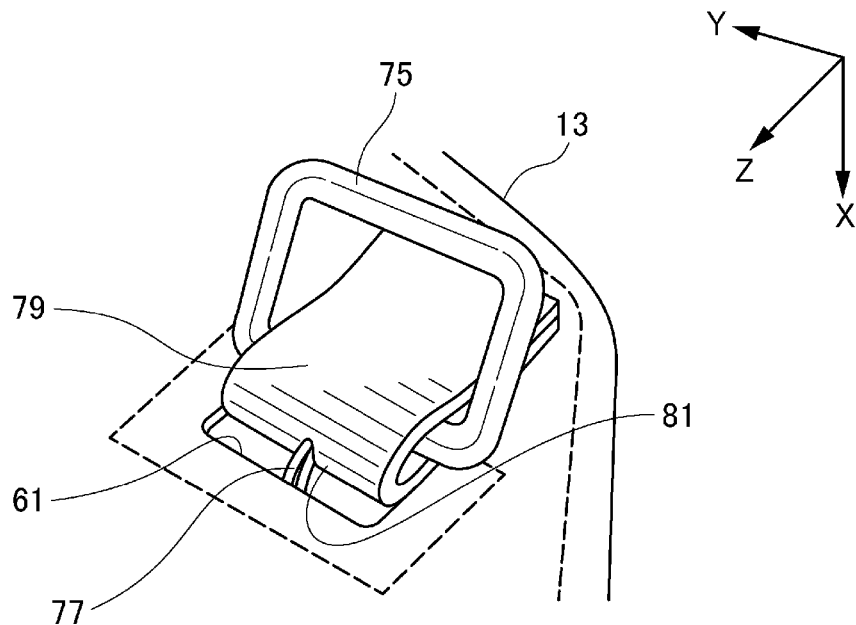
FIG. 11 is a perspective view of an attachment element fixed in the vicinity of a through hole on the base rear surface.

FIG. 11 is a perspective view of the attachment element 75 fixed in the vicinity of the through hole in the base rear surface 37.

The attachment element 75 is fixed to the base rear surface 37 in the vicinity of the through hole 61. In the attachment element 75, a short fixing belt 79 is passed through the ring fitting, and the short fixing belt 79 is folded in half and fixed to the base rear surface 37 by sewing, an adhesive, or the like. The second attachment string 77 is tied to the ring fitting.

Figure 12:
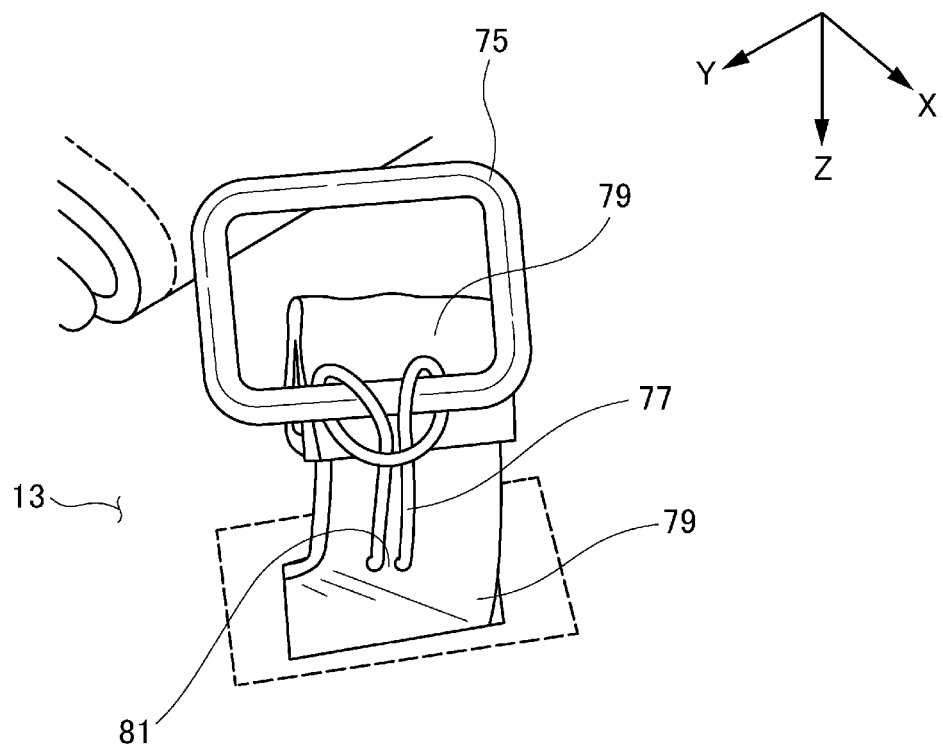
FIG. 12 is a perspective view of a main part before a short fixing belt is sewed.

FIG. 12 is a perspective view of a main part before the short fixing belt 79 is sewed.

A string through hole 81 is formed in the short fixing belt 79. The second attachment string 77 led out from the through hole 61 is passed through the string through hole 81, and the ring fitting is passed through the ring at a tip end of the second attachment string 77, whereby the second attachment string 77 is tied to the ring fitting. In the ring fitting to which the second attachment string 77 is tied, the short fixing belt 79 is folded in half and fixed to the base rear surface 37 by sewing, the adhesive, or the like.

Next, the portable terminal will be described.

Figure 13:
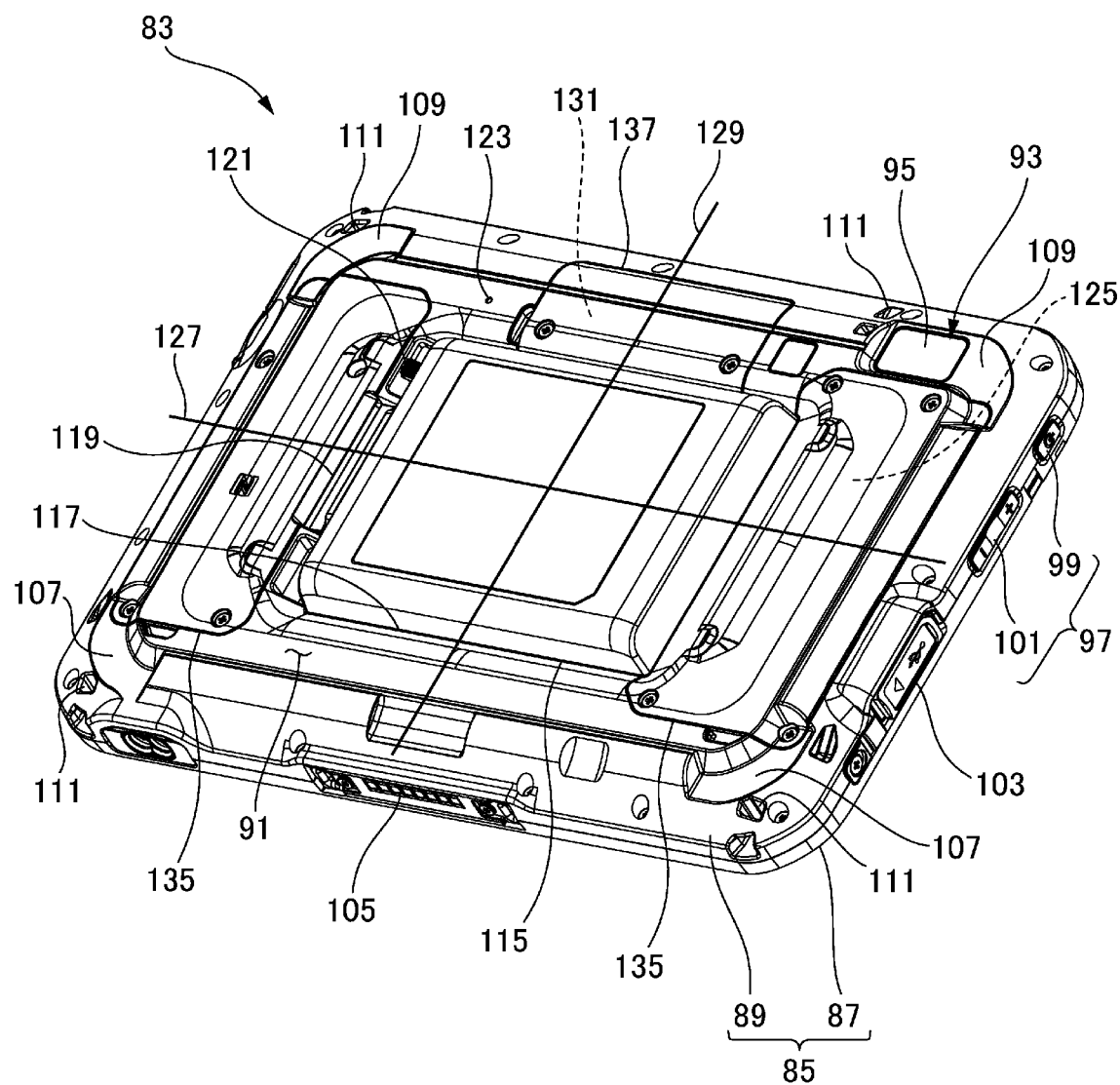
FIG. 13 is a perspective view of a portable terminal as viewed from a rear side.

FIG. 13 is a perspective view of a portable terminal 83 as viewed from a rear side.

The portable terminal 83 includes, for example, a personal terminal or a business terminal, and is, for example, an electronic device such as a mobile phone such as a smartphone, a tablet, a digital camera, a portable personal computer, a wireless device, or a settlement terminal. A terminal main body 85 of the portable terminal 83 is formed in a substantially rectangular plate shape in the plan view. In the terminal main body 85, a display (not shown) including a liquid crystal panel, a touch panel, and the like is provided on a terminal front surface which is the rear side in FIG. 13. The terminal main body 85 is formed by combining a front cover 87 on a surface side and a rear cover 89 on a rear surface side, which are divided into two in the thickness direction. The front cover 87 and the rear cover 89 are made of resin or metal.

A rear camera 93 is provided on a terminal rear surface 91. The rear camera 93 is covered with a rectangular cover glass 95. An operation button 97 is provided on a right side surface of the terminal main body 85. As the operation button 97, for example, a power button 99, a volume button 101, and the like are provided. In addition, on a lower side surface of the terminal main body 85, in addition to an opening and closing cover 103 for a USB port and an extension bus connector (charging terminal 105) for a cradle, a DC input terminal, a headset terminal, and the like (not shown) are disposed. A total of four strap fixing portions 111 are provided on the terminal rear surface 91 at terminal lower corner portions 107 on both sides and terminal upper corner portions 109 on both sides. The strap fixing portions 111 are connected to the string ring 57 connected to a male buckle side of the buckle-attached belt 47 and the first attachment string 63 hooked on the string fixing metal fitting 65.

A plurality of types of batteries having different distances perpendicular to the terminal rear surface 91 can be attached to a terminal central portion of the terminal rear surface 91. In the embodiment, the battery is a thin normal battery pack 113 (see FIG. 14) or a thick large-capacity battery pack 115 (see FIG. 13). The battery is formed in a rectangular shape in the plan view. A part of the battery in the thickness direction is inserted and mounted in a battery mounting opening 117 formed in the rear cover 89. On the rear cover 89, a locking release projection 119 and a locking lock button 121 are disposed along one short side of the battery. A rear microphone 123 is disposed on an upper side of the locking lock button 121.

A first mounting portion 125 to which a first electronic device can be attached is provided in a part of a periphery of the battery. In the embodiment, the first electronic device is a module called a gadget. That is, the gadget can be attached to and detached from the first mounting portion 125. There are a plurality of types of gadgets having different thicknesses. Examples of the gadget include a barcode reader, a USB connector, a magnetic card reader, a contact IC card reader, and a LAN connector.

In the embodiment, the part of the periphery is, for example, the right side of the battery. In the strap 11, the base 13 is disposed so as to cover the terminal central portion where the battery is disposed. Here, two straight lines orthogonal to each other inside the periphery are assumed. One of the two orthogonal straight lines (straight line 127) passes through the above-described first mounting portion 125. The other of the two orthogonal straight lines (straight line 129) passes through a second mounting portion 131 which is another part of the periphery. In the embodiment, the other part of the periphery is the upper side of the battery. The second electronic device can be attached to the second mounting portion 131. The second electronic device is mainly a barcode reader 133 (see FIG. 14).

A pair of left-right covers 135 is detachably provided on the first mounting portion 125. The second mounting portion 131 is detachably provided with an upper cover 137. The portable terminal 83 has a wireless area on the left side and option areas on the right side and the upper side when viewed from the rear side. An optional device such as a card reader can be connected to the option area. The pair of left-right covers 135 and the upper cover 137 are mounted so as to freely expose the first mounting portion 125 and the second mounting portion 131 to which the functional components and optional devices are attached. Examples of the card reader include the magnetic card reader, the contact IC card reader, and a non-contact IC card reader and writer.

Figure 14:
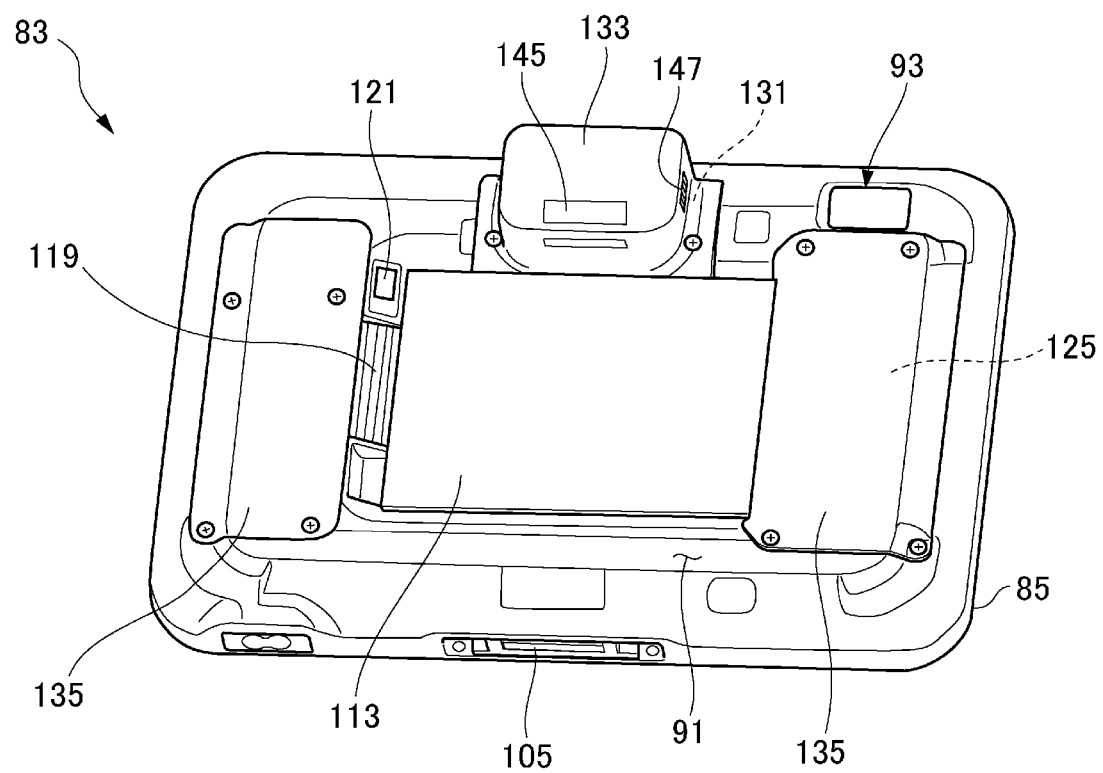
FIG. 14 is a perspective view of a terminal rear surface showing a first installation example of an optional device with respect to a terminal main body.

FIG. 14 is a perspective view of the terminal rear surface 91 showing a first installation example of the optional device with respect to the terminal main body 85.

The barcode reader 133 is attached to the second mounting portion 131 from which the upper cover 137 is removed.

Figure 15:
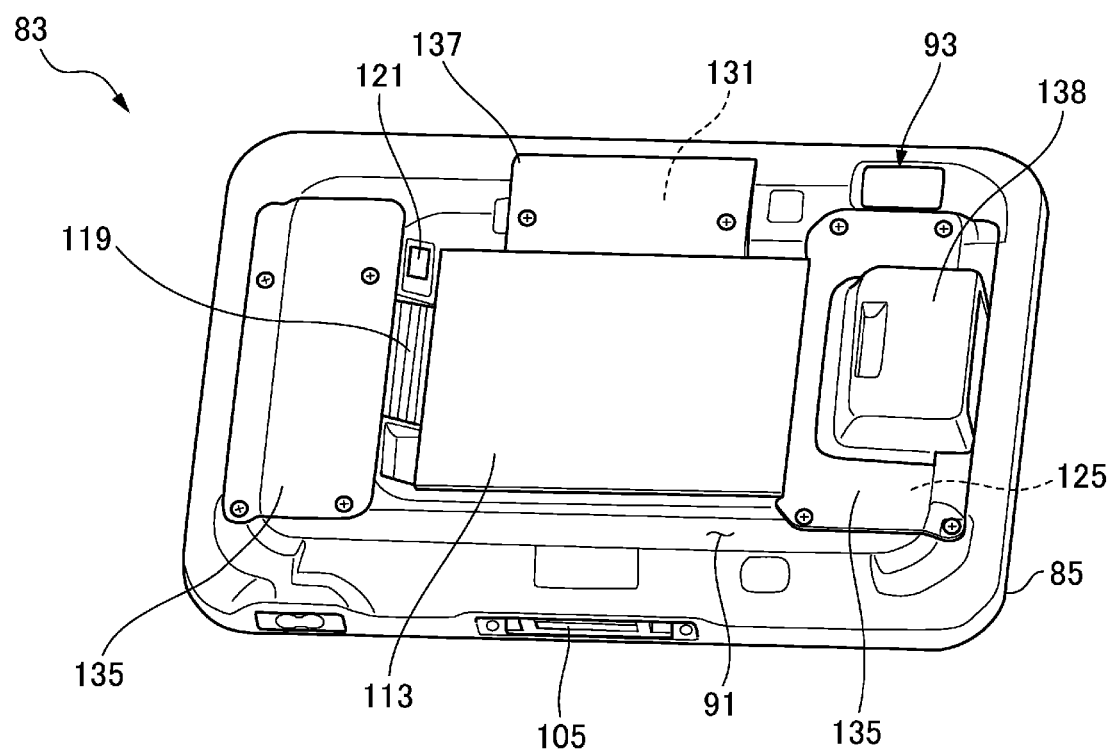
FIG. 15 is a perspective view of the terminal rear surface showing a second installation example of the optional device with respect to the terminal main body.

FIG. 15 is a perspective view of the terminal rear surface 91 showing a second installation example of the optional device with respect to the terminal main body 85.

A barcode reader 138 is attached to the first mounting portion 125 from which the left-right cover 135 on the right side is removed.

Figure 16:
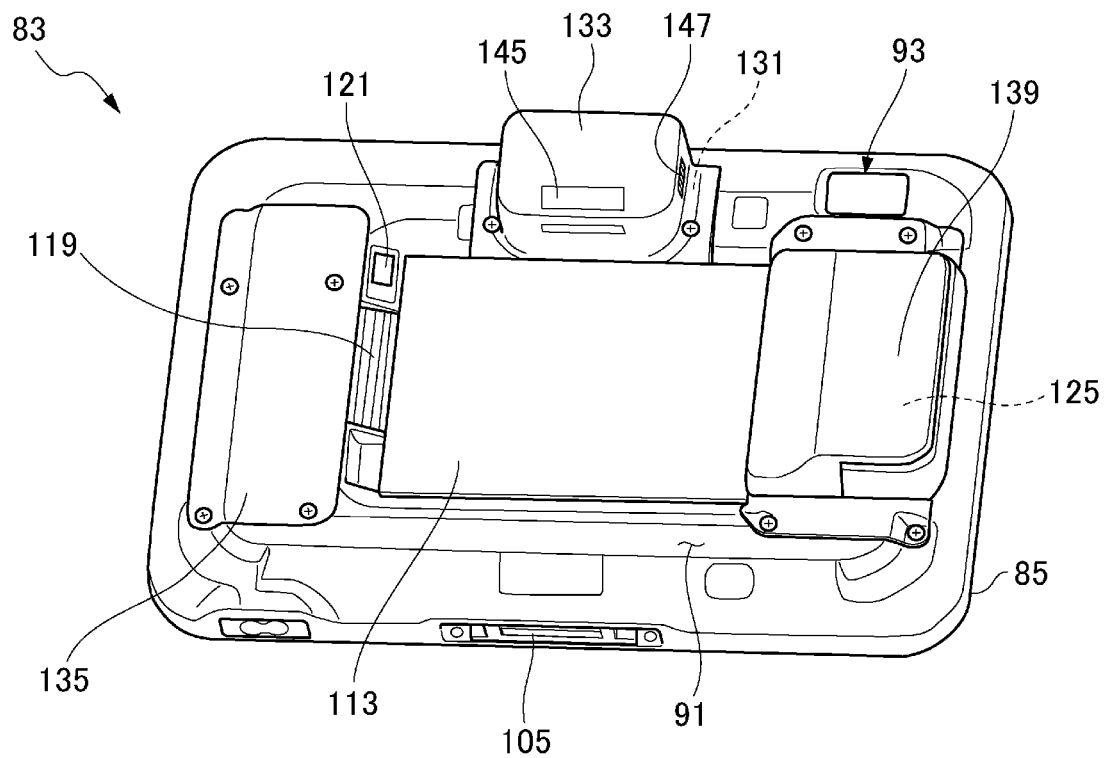
FIG. 16 is a perspective view of the terminal rear surface showing a third installation example of the optional device with respect to the terminal main body.

FIG. 16 is a perspective view of the terminal rear surface 91 showing a third installation example of the optional device with respect to the terminal main body 85.

The barcode reader 133 is attached to the second mounting portion 131 from which the upper cover 137 is removed. A magnetic card reader 139 is attached to the first mounting portion 125 from which the left-right cover 135 on the right side is removed.

Figure 17:
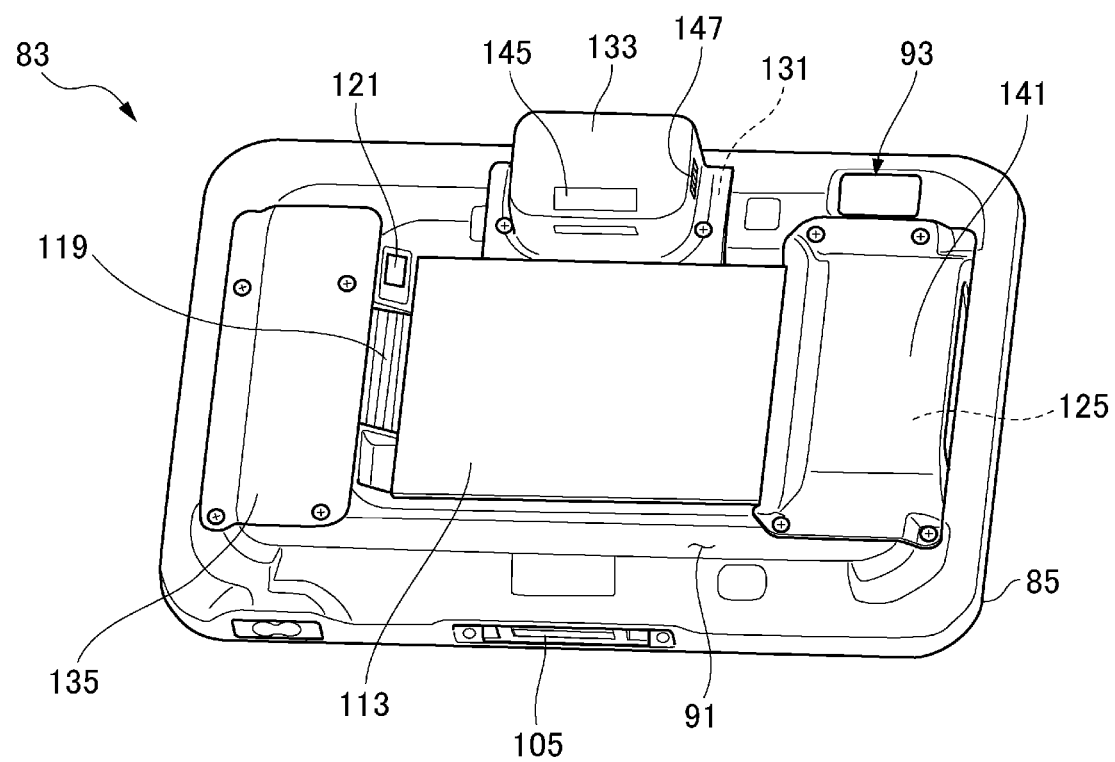
FIG. 17 is a perspective view of the terminal rear surface showing a fourth installation example of the optional device with respect to the terminal main body.

FIG. 17 is a perspective view of the terminal rear surface 91 showing a fourth installation example of the optional device with respect to the terminal main body 85.

The barcode reader 133 is attached to the second mounting portion 131 from which the upper cover 137 is removed. A USB connector 141 is attached to the first mounting portion 125 from which the left-right cover 135 on the right side is removed.

Figure 18:
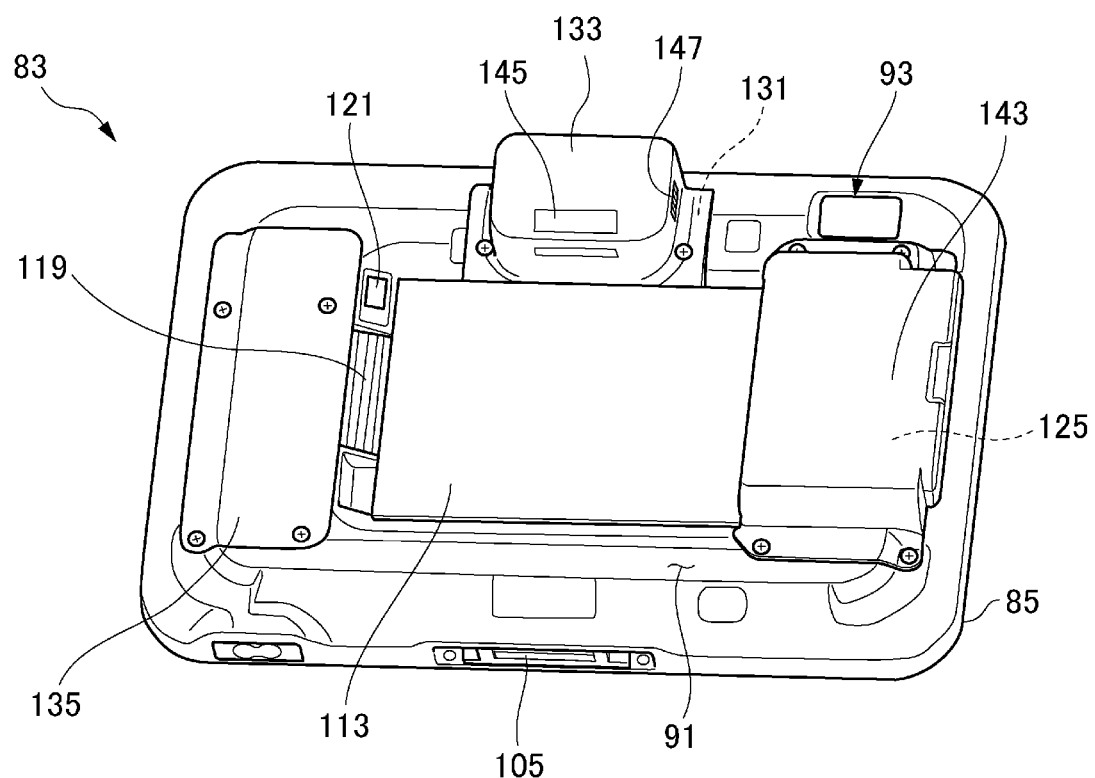
FIG. 18 is a perspective view of the terminal rear surface showing a fifth installation example of the optional device with respect to the terminal main body.

FIG. 18 is a perspective view of the terminal rear surface 91 showing a fifth installation example of the optional device with respect to the terminal main body 85.

The barcode reader 133 is attached to the second mounting portion 131 from which the upper cover 137 is removed. A contact IC card reader 143 is attached to the first mounting portion 125 from which the left-right cover 135 on the right side is removed.

Figure 19:
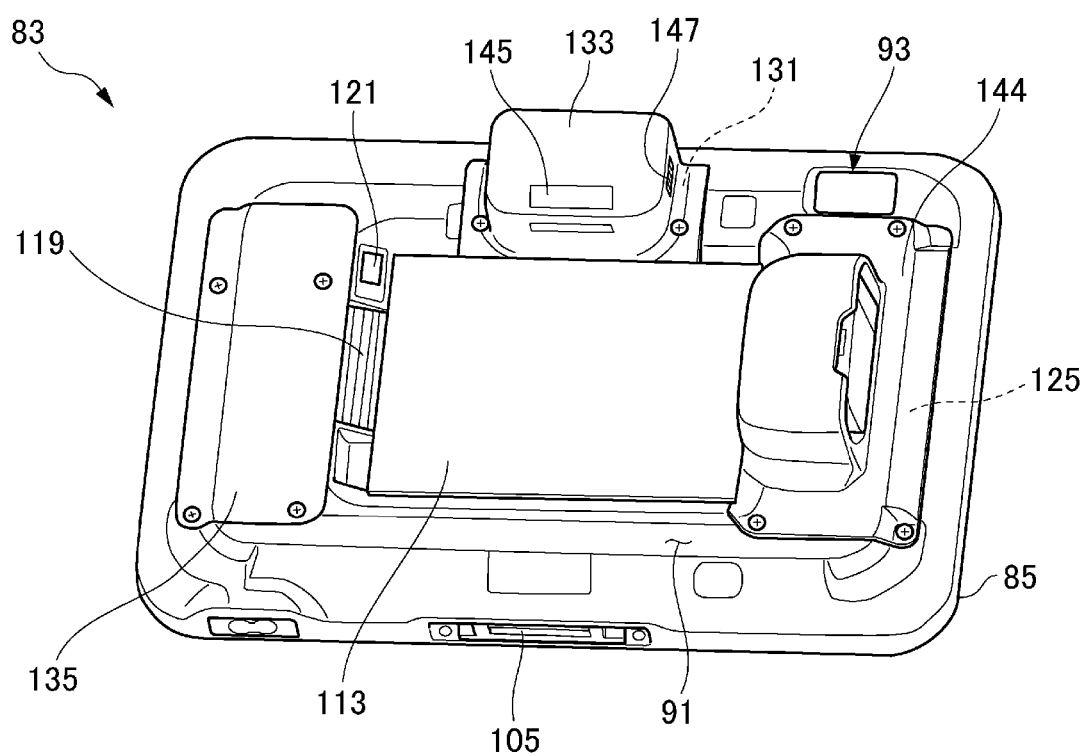
FIG. 19 is a perspective view of the terminal rear surface showing a sixth installation example of the optional device with respect to the terminal main body.

FIG. 19 is a perspective view of the terminal rear surface 91 showing a sixth installation example of the optional device with respect to the terminal main body 85.

The barcode reader 133 is attached to the second mounting portion 131 from which the upper cover 137 is removed. A LAN connector 144 is attached to the first mounting portion 125 from which the left-right cover 135 on the right side is removed. The combination of optional devices mounted to the first mounting portion 125 and the second mounting portion 131 is not limited to the combinations shown in FIGS. 14 to 19, and may be other combinations.

Next, an example of a variation of a method of attaching the strap 11 will be described.

Figure 20:
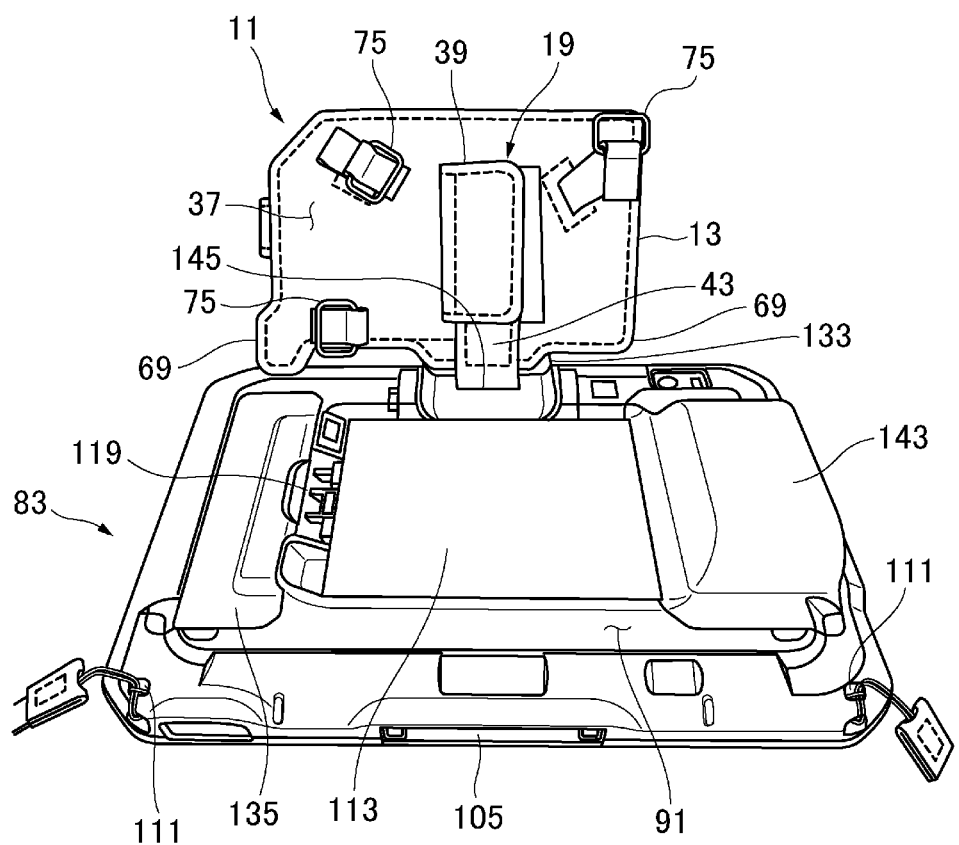
FIG. 20 is a perspective view showing an example of attachment of the strap when a thin normal battery pack, a barcode reader, and a gadget are mounted to the portable terminal, in a state where the base is not fixed.

FIG. 20 is a perspective view showing an example of attachment of the strap 11 when the thin normal battery pack 113, the barcode reader 133, and the gadget are mounted to the portable terminal 83, in a state where the base 13 is not fixed.

In this example, in the strap 11, the insertion belt 43 is inserted into a hole portion 145 of the barcode reader 133. The adjuster portion 19 is used in a folded state. The string rings 57 of the male buckles 51, which are decoupled from the female buckles 49, are tied to the strap fixing portions 111 in the terminal lower corner portions 107 on both sides.

Figure 21:
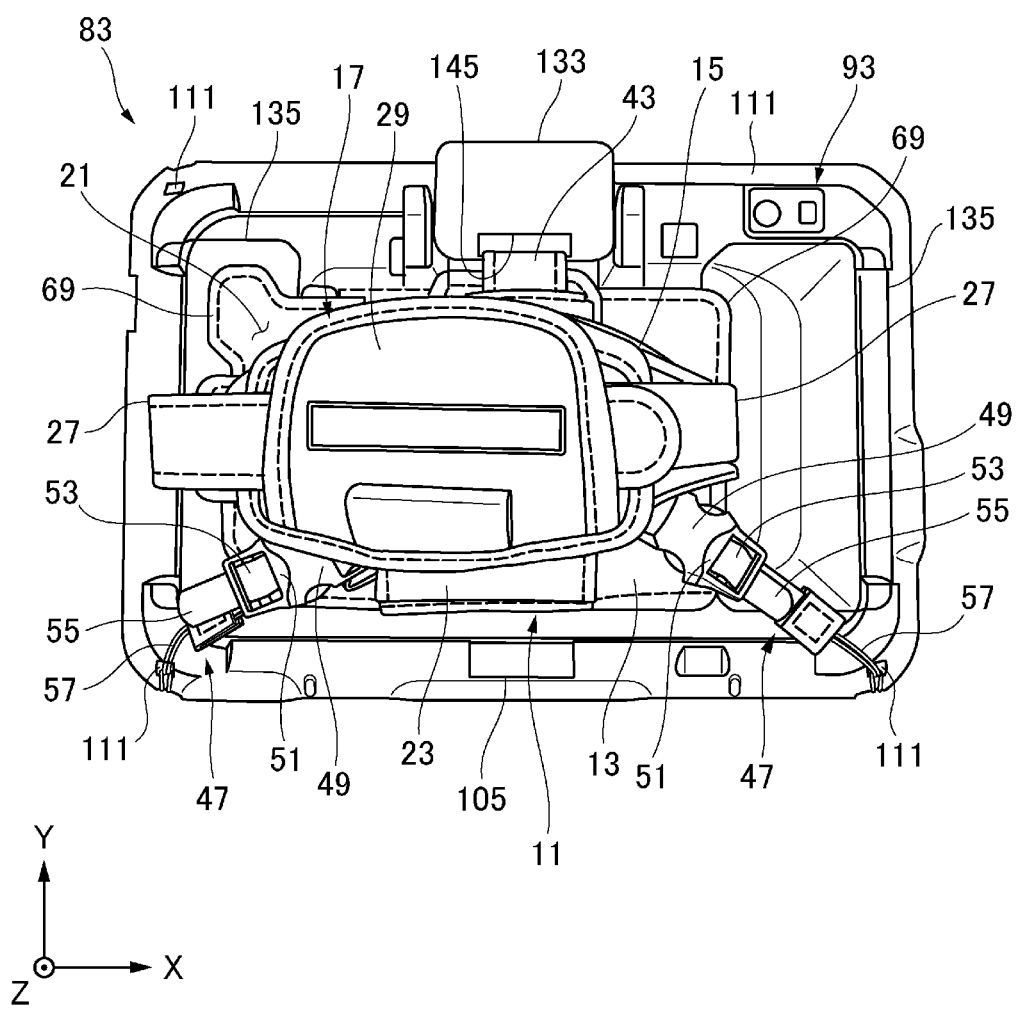
FIG. 21 is a front view of the strap in which the attachment is completed from the state of FIG. 20.

FIG. 21 is a front view of the strap 11 in which the attachment is completed from the state of FIG. 20.

From the state shown in FIG. 20, the base 13 of the strap 11 is overlapped on the terminal central portion, and the left and right male buckles 51 are coupled to the female buckles 49 fixed to the base 13. The portable terminal 83 is provided with the charging terminal 105 on a terminal side surface of the portable terminal 83, which is on a side opposite to the second mounting portion 131 with respect to the terminal central portion sandwiched therebetween. In the base 13, the base lower corner portions 45 on both sides sandwiching the charging terminal 105 are fixed to the terminal lower corner portions 107 on both sides sandwiching the charging terminal 105 by the buckle-attached belts 47 whose length is adjustable.

After the male buckle 51 and the female buckle 49 are coupled to each other, the belt extra length portion 55 of the male buckle 51 is pulled to the side opposite to (outward) the base 13, so that the buckle-attached belt 47 is fixed at a regular position where the adjuster portion 19 is in contact with the battery. Accordingly, the strap 11 is completely mounted by three-point fastening.

Figure 22:
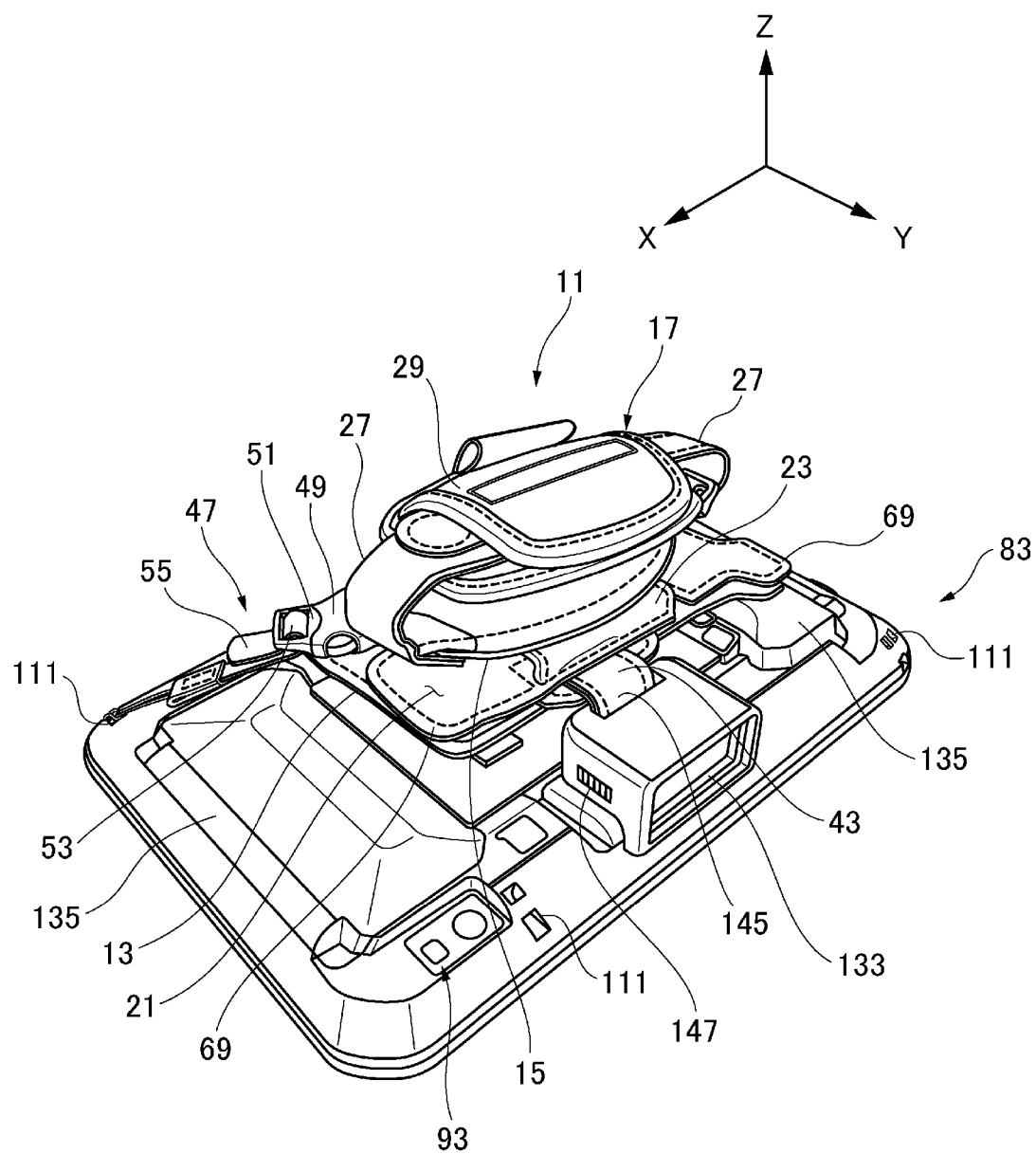
FIG. 22 is a perspective view of FIG. 21.

FIG. 22 is a perspective view of FIG. 21.

When the strap 11 is mounted by three-point fastening, a central portion of an upper edge of the base 13 is fixed by the insertion belt 43 passing through the hole portion 145 of the barcode reader 133. The barcode reader 133 includes an operation unit 147 on a device side surface which is arranged in a circumferential direction of the periphery. The barcode reader 133 includes the hole portion 145 in a device lower portion facing the terminal central portion. The insertion belt 43 is inserted into the hole portion 145, is folded back, and overlaps the belt attachment plate 41. Accordingly, in the strap 11, the operation unit 147 provided on the device side surface of the barcode reader 133 does not interfere with the first attachment string 63 as compared with the case where the two first attachment strings 63 are fastened to the terminal upper corner portions 109 on both sides (that is, the case of four-point fastening), and thus it is not difficult to operate.

Figure 23:
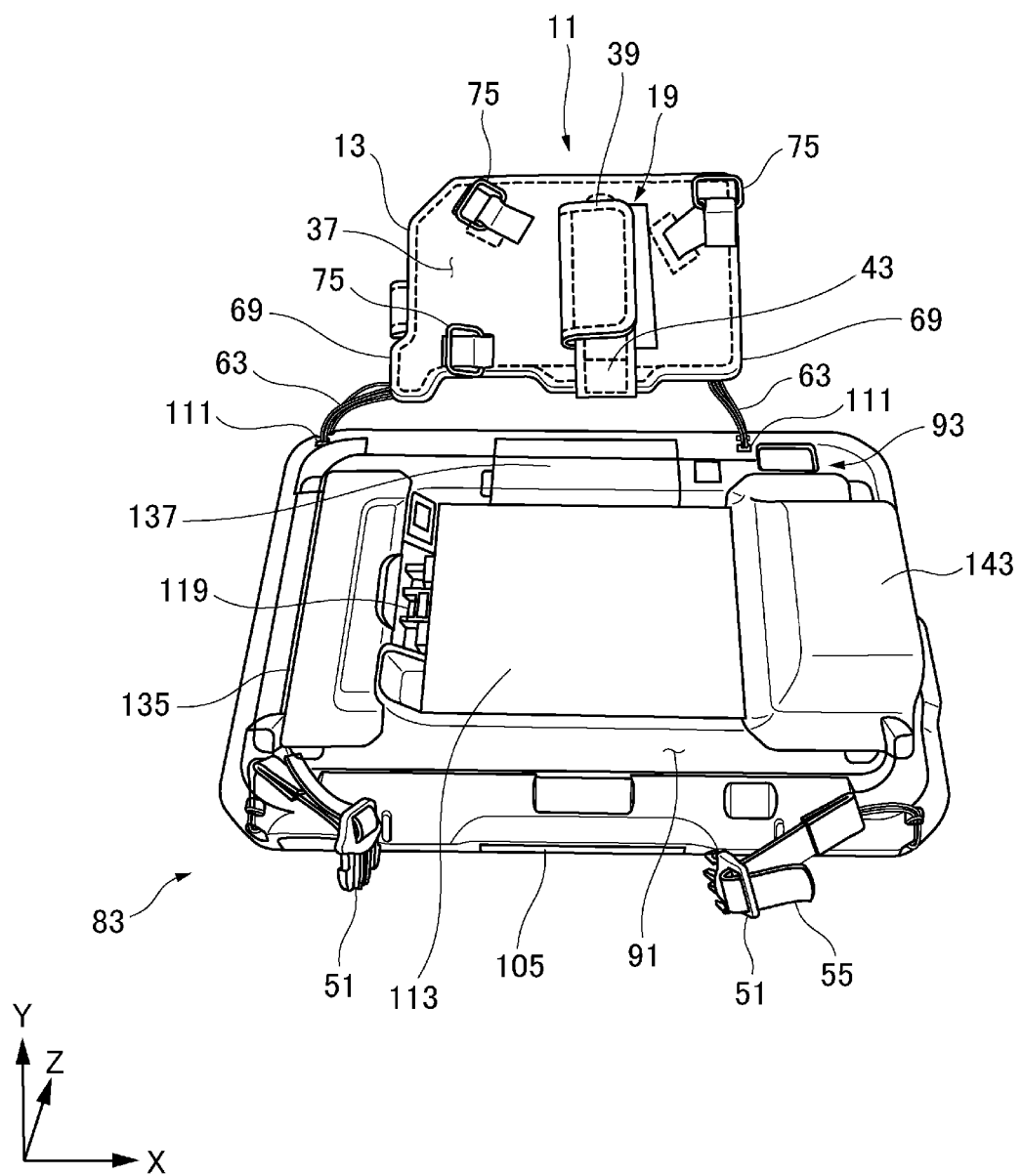
FIG. 23 is a perspective view showing an example of attachment of the strap when the thin normal battery pack and the gadget are mounted to the portable terminal, in the state where the base is not fixed.

FIG. 23 is a perspective view showing an example of attachment of the strap 11 when the thin normal battery pack 113 and the gadget are mounted to the portable terminal 83, in the state where the base 13 is not fixed.

In this example, the strap 11 uses the first attachment strings 63 stored in the accommodation portions 67 in the base upper corner portions 69 on both sides. The adjuster portion 19 is used in the folded state. The first attachment strings 63 are hooked on the string fixing metal fittings 65 fixed to the accommodation portions 67 in the base upper corner portions 69 on both sides. The first attachment strings 63 hooked on the string fixing metal fittings 65 are passed through the strap fixing portions 111 at the terminal upper corner portions 109 on both sides, and then returned to the string fixing metal fittings 65 again to be hooked. The string fixing metal fitting 65 on which the first attachment string 63 is hooked is sandwiched between the two hook-and-loop fasteners 31 to restrict the string from being detached.

Figure 24:
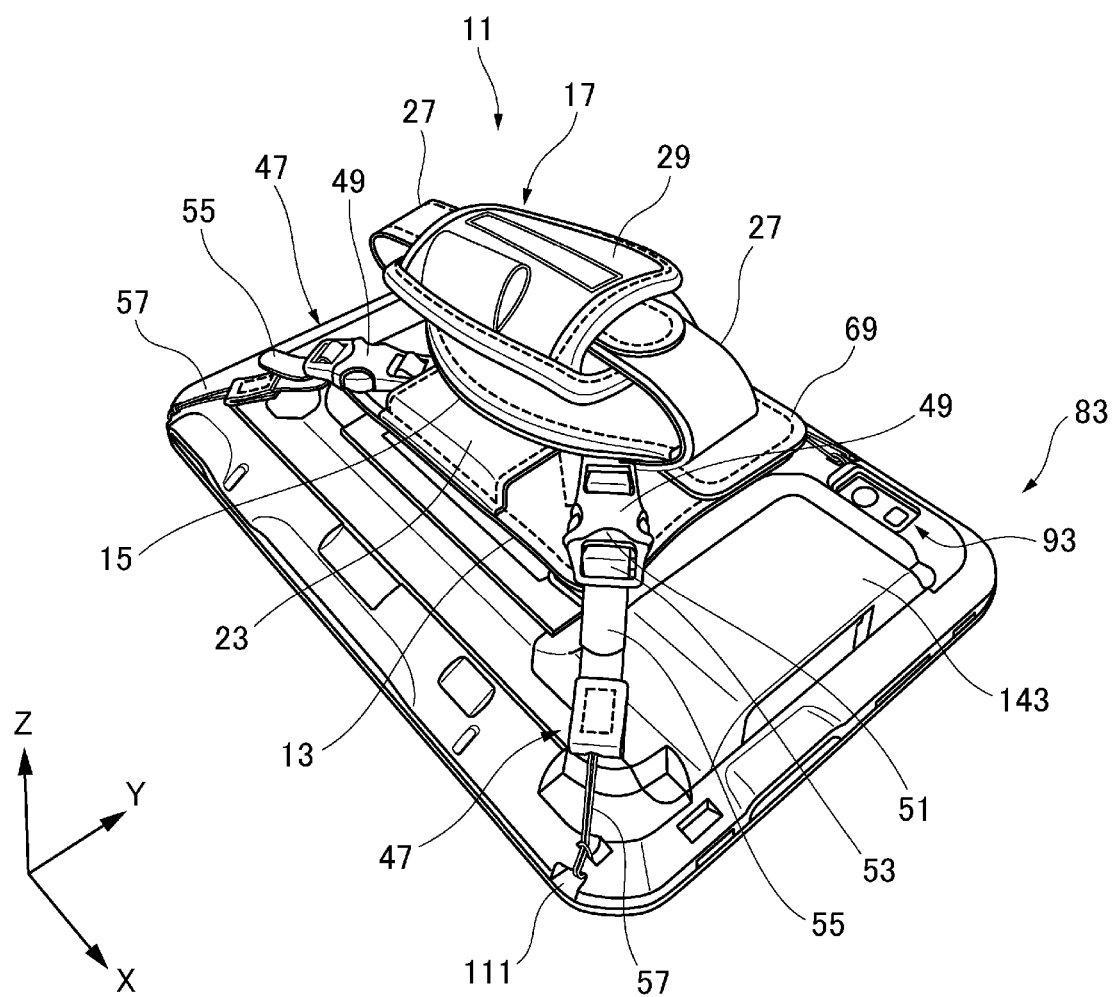
FIG. 24 is a perspective view of the strap in which the attachment is completed from the state of FIG. 23.

FIG. 24 is a perspective view of the strap 11 in which the attachment is completed from the state of FIG. 23.

The string rings 57 of the male buckles 51, which are coupled to the female buckles 49, are tied to the strap fixing portions 111 in the terminal lower corner portions 107 on both sides. After the male buckle 51 and the female buckle 49 are coupled to each other, the belt extra length portion 55 of the male buckle 51 is pulled to the side opposite to (outward) the base 13, so that the buckle-attached belt 47 is fixed at the regular position where the adjuster portion 19 is in contact with the battery. Accordingly, the strap 11 is completely mounted by four-point fastening.

Figure 25:
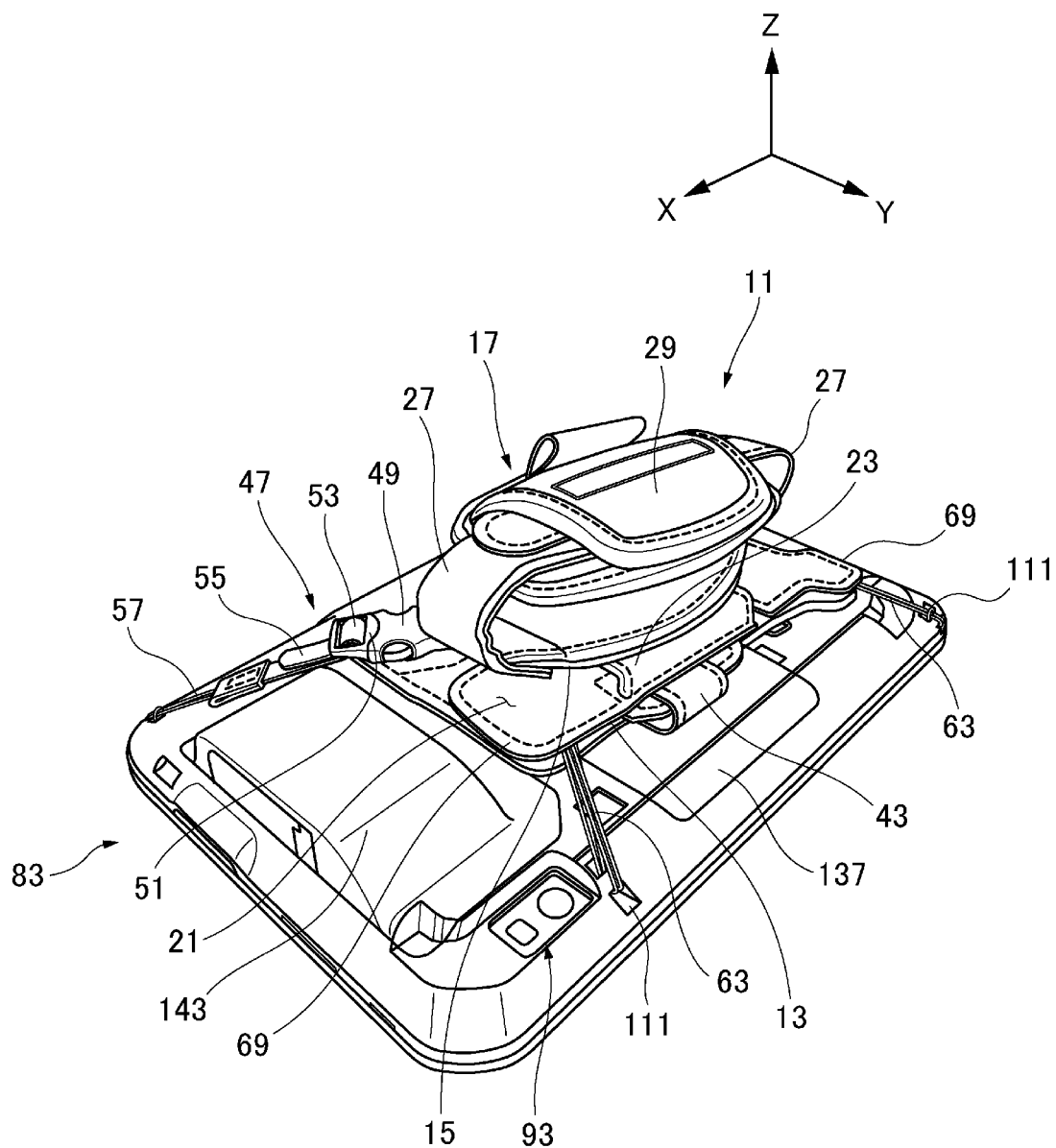
FIG. 25 is a perspective view of an upper side of the strap as viewed from the forward direction.

FIG. 25 is a perspective view of the upper side of the strap 11 as viewed from the forward direction.

The base front surface 21 of the strap 11 is substantially flush with the gadget. The rotary plate 15 is provided on the base front surface 21 via the rotary plate support mechanism portion 23. The holding portion 17 into which the palm portion 35 is inserted is provided on the rotary plate front surface 25.

Figure 26:
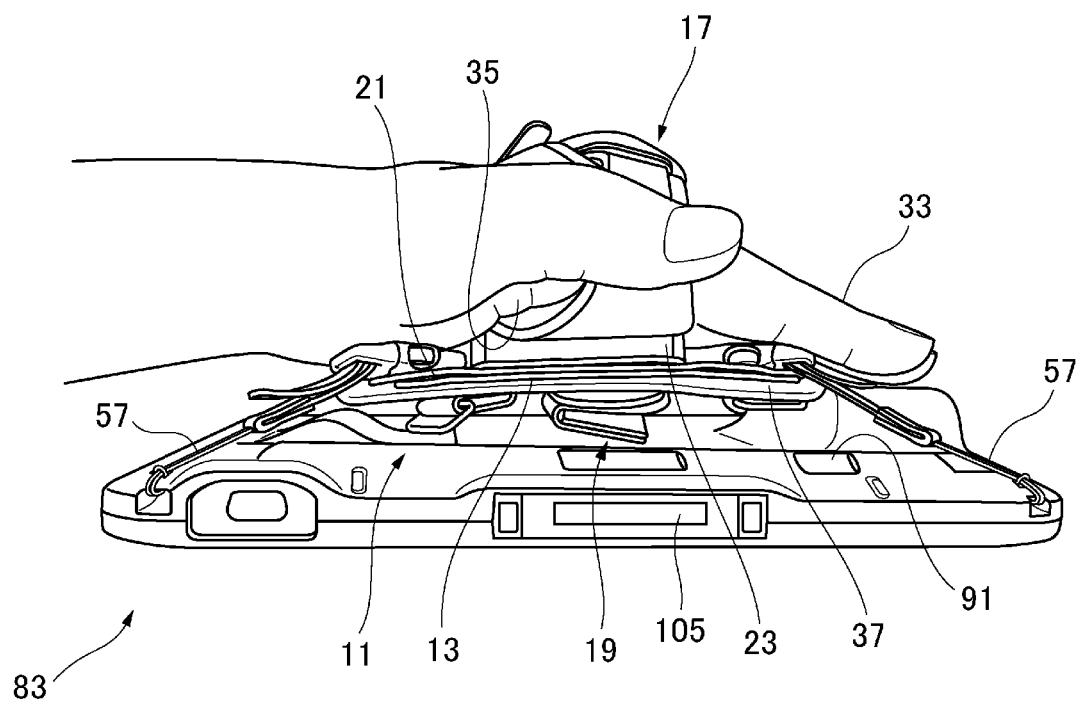
FIG. 26 is a bottom view of the strap in which a palm portion is inserted into a holding portion, as viewed from a lower side.

FIG. 26 is a bottom view of the strap 11 in which the palm portion 35 is inserted into the holding portion 17, as viewed from the lower side.

FIGS. 20 to 25 show usage examples in a state where the adjuster portion 19 is folded. In this usage example, even when the gadget is attached, the base 13 is separated from the terminal rear surface 91 by the folded adjuster portion 19. That is, since the base 13 is located at a position higher than the gadget, even when the portable terminal 83 is rotated by the rotary plate 15, the fingers 33 inserted into the holding portion 17 are less likely to interfere with the gadget.

Figure 27:
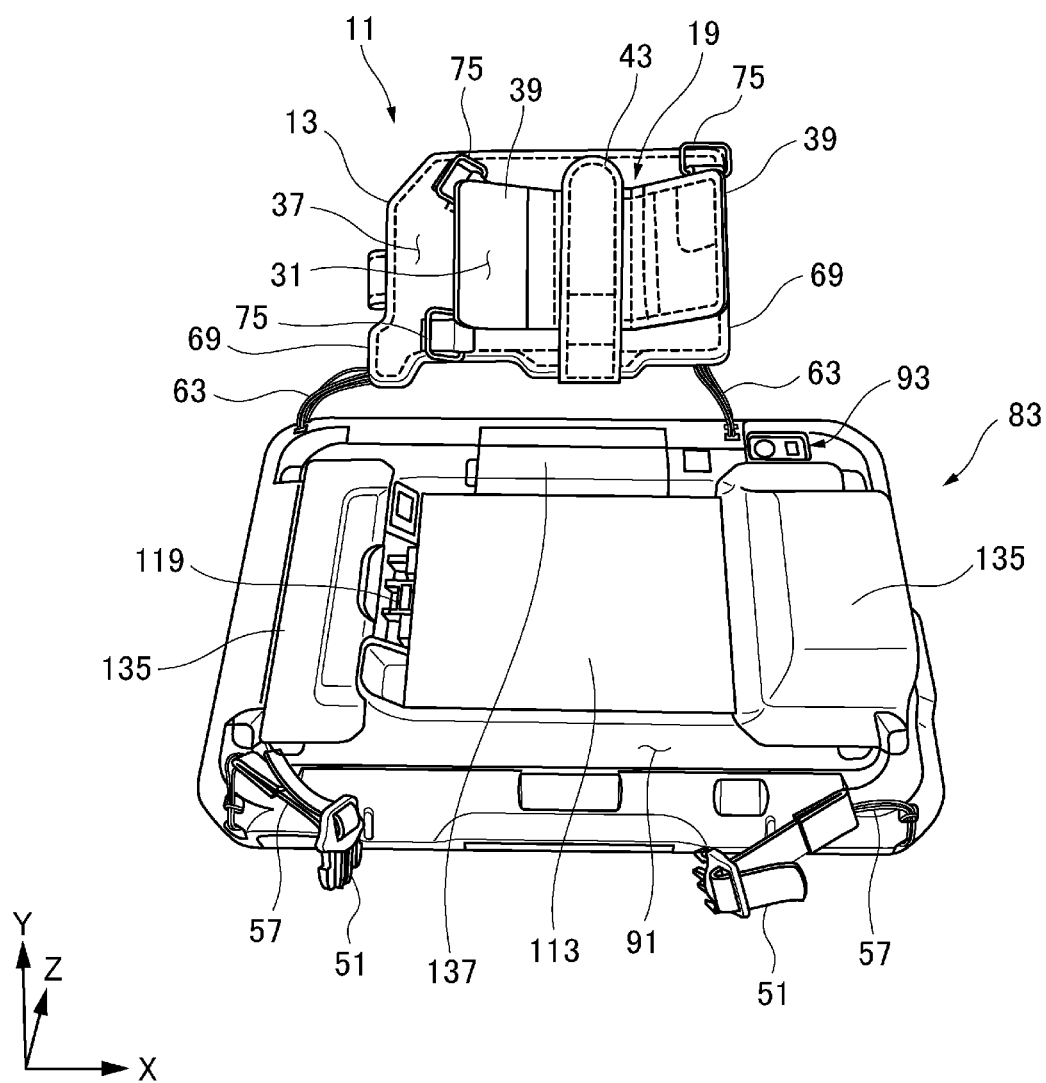
FIG. 27 is a perspective view showing an example of attachment of the strap when the thin normal battery pack is mounted to the portable terminal and the gadget is not attached to the portable terminal, in the state where the base is not fixed.

FIG. 27 is a perspective view showing an example of attachment of the strap 11 when the thin normal battery pack 113 is mounted to the portable terminal 83 and the gadget is not mounted to the portable terminal 83, in the state where the base 13 is not fixed.

In this example, the strap 11 uses the first attachment strings 63 stored in the accommodation portions 67 in the base upper corner portions 69 on both sides. The adjuster portion 19 is used in a deployed state in which the pair of blade portions 39 are opened. The first attachment strings 63 are hooked on the string fixing metal fittings 65 fixed to the accommodation portions 67 in the base upper corner portions 69 on both sides. The first attachment strings 63 hooked on the string fixing metal fittings 65 are passed through the strap fixing portions 111 at the terminal upper corner portions 109 on both sides, and then returned to the string fixing metal fittings 65 again to be hooked. The string fixing metal fitting 65 on which the first attachment string 63 is hooked is sandwiched between the two hook-and-loop fasteners 31.

Figure 28:
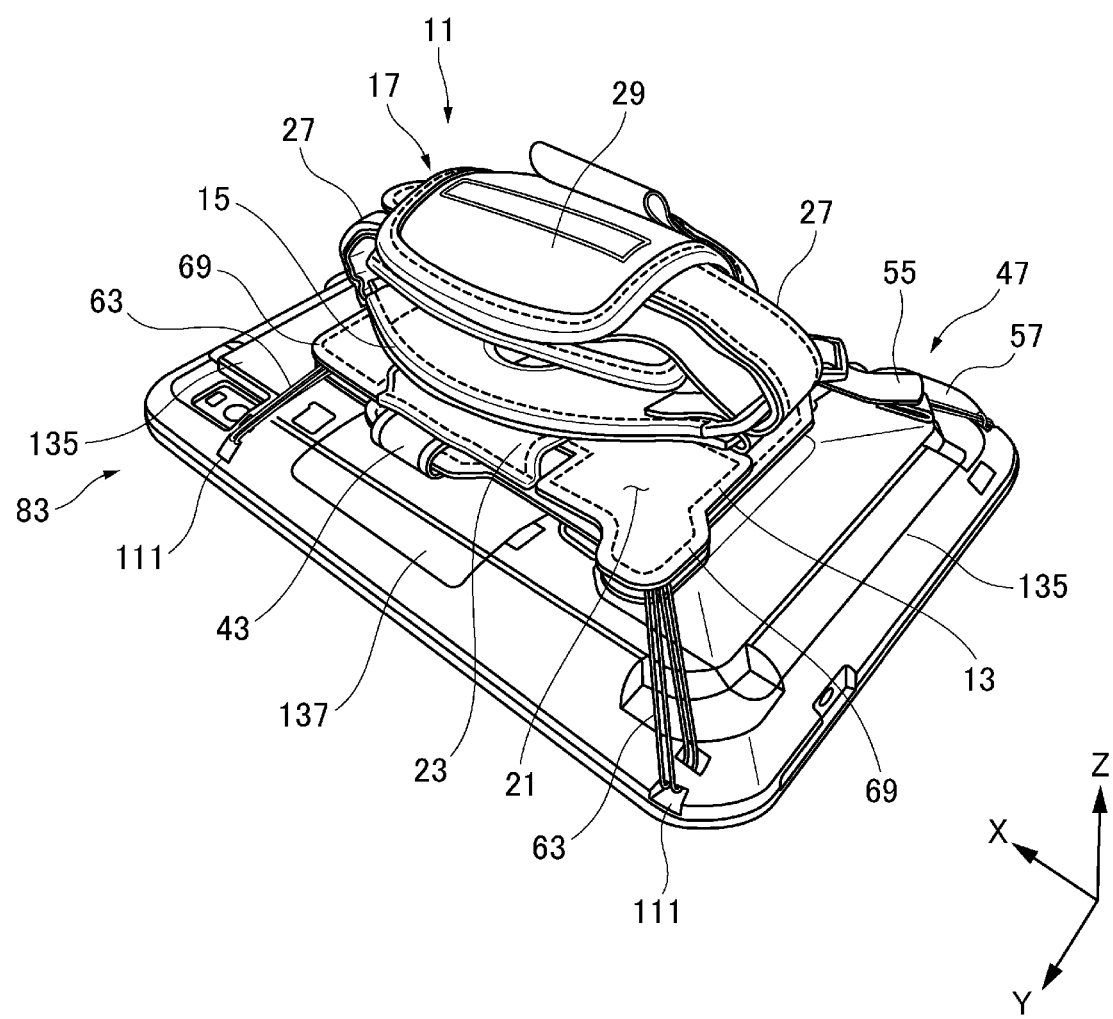
FIG. 28 is a perspective view of the strap in which the attachment is completed from the state of FIG. 27.

FIG. 28 is a perspective view of the strap 11 in which the attachment is completed from the state of FIG. 27.

The string rings 57 of the male buckles 51, which are decoupled from the female buckles 49, are tied to the strap fixing portions 111 in the terminal lower corner portions 107 on both sides. The male buckles 51 are coupled to the female buckles 49 fixed to the base lower corner portions 45 on both sides. After the male buckle 51 and the female buckle 49 are coupled to each other, the belt extra length portion 55 of the male buckle 51 is pulled to the side opposite to (outward) the base 13, so that the buckle-attached belt 47 is fixed at the regular position where the adjuster portion 19 is in contact with the battery. Accordingly, the strap 11 is completely mounted by four-point fastening.

Figure 29:
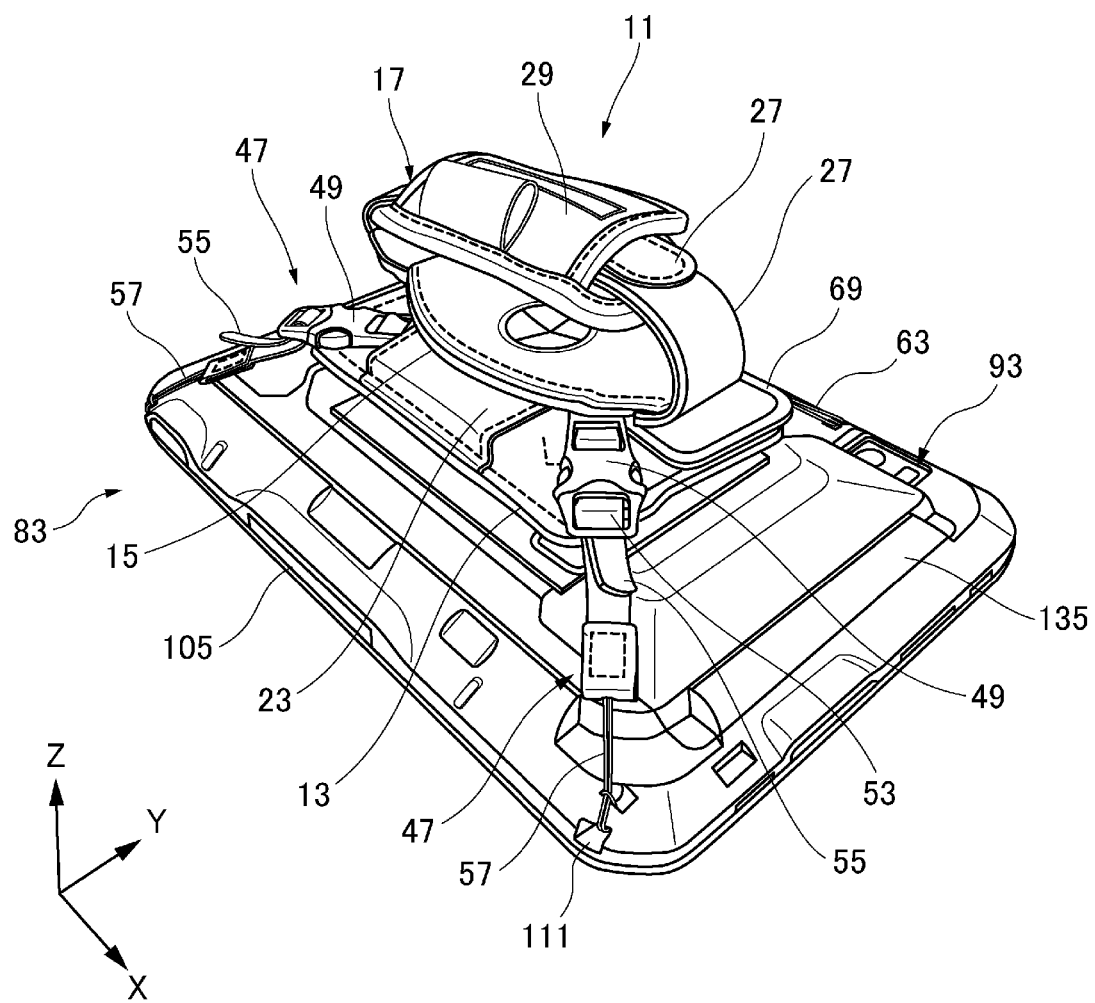
FIG. 29 is a perspective view of FIG. 28 as viewed from the upper side.

FIG. 29 is a perspective view of FIG. 28 as viewed from the upper side.

The strap 11 is disposed at a position where the base front surface 21 is slightly floated from the left-right covers 135. The rotary plate 15 is provided on the base front surface 21 via the rotary plate support mechanism portion 23. The holding portion 17 into which the palm portion 35 is inserted is provided on the rotary plate front surface 25.

FIG. 30 is an explanatory diagram of a table for determining the folded state or the deployed state of the adjuster portion 19 according to the type of the battery and the presence or absence of the gadget.

When the gadget is not present, the strap 11 is used in the deployed state both when the thin normal battery pack 113 and the thick large-capacity battery pack 115 are mounted.

When the gadget is present, the strap 11 is used in the folded state when the thin normal battery pack 113 is mounted, and is used in the deployed state when the thick large-capacity battery pack 115 is mounted.

Next, functions of the above configuration will be described.

The strap 11 according to the embodiment includes the base 13 having a plate shape and that is detachably attached along a terminal rear surface 91 on a side opposite to a terminal front surface on which a display of the portable terminal 83 is provided, the rotary plate 15 that is attached to the base front surface 21 on a side opposite to the base rear surface 37 of the base facing the terminal rear surface 91 so as to be rotatable around a rotation axis perpendicular to the base front surface 21, the annular holding portion 17 that is fixed to the rotary plate front surface 25 on a side opposite to a rotary plate rear surface facing the base front surface 21 and into which the palm portion 35 is inserted from the finger 33, and the adjuster portion 19 that is fixed to the base rear surface 37 and the adjuster portion 19 varies a distance perpendicular to the base rear surface 37 from the base rear surface 37 of the base 13 by folding a foldable portion of the adjuster portion 19.

The strap 11 according to the embodiment includes the base 13 for attachment to the terminal rear surface 91. In the strap 11, the rotary plate 15 is rotatably attached to the base front surface 21, and the holding portion 17 into which the palm portion 35 is inserted from the finger 33 is fixed to the rotary plate front surface 25. Therefore, in the state shown in FIG. 26 in which the palm portion 35 is inserted into the holding portion 17, the user can rotate the portable terminal 83 in the vertical direction or the horizontal direction by rotating the base 13 attached to the terminal rear surface 91 with respect to the rotary plate 15 integrated with the holding portion 17.

Various optional devices are installed on the terminal rear surface 91 to which the base 13 is attached. There are a plurality of optional devices having different thicknesses.

Therefore, in the strap 11, the adjuster portion 19 is fixed to the base rear surface 37 attached to the terminal rear surface 91. The distance of the adjuster portion 19 perpendicular to the base rear surface 37 can be changed by folding. That is, in the folded state, the distance between the terminal rear surface 91 and the base rear surface 37 can be increased by increasing the thickness, and in the deployed state, the distance between the terminal rear surface 91 and the base rear surface 37 can be decreased by decreasing the overlap and decreasing the thickness.

Accordingly, the strap 11 adjusts the thickness of the strap 11 using the adjuster portion 19. Even when the optional devices of various thicknesses are installed in the portable terminal 83, it is possible to prevent the rotation of the portable terminal 83 in the vertical direction and the horizontal direction from being inhibited. When it is not necessary to increase the thickness of the strap 11, the adjuster portion 19 can be deployed to be thin. Therefore, it is possible to prevent the thickness of the strap 11 from becoming excessively large.

Figure 31:
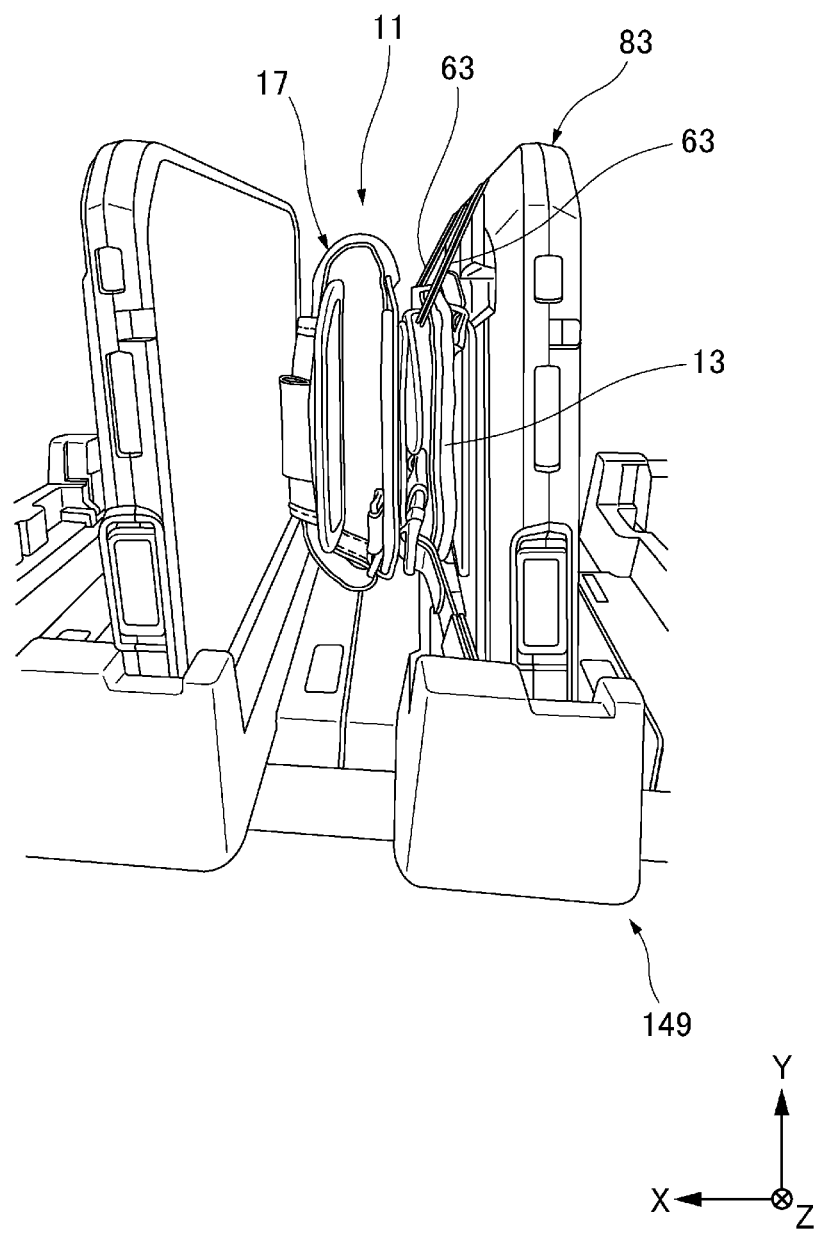
FIG. 31 is a side view of the portable terminal mounted with the strap and set in a cradle.

FIG. 31 is a side view of the portable terminal 83 mounted with the strap 11 and set in a cradle 149.

Since it is possible to prevent the thickness of the strap 11 from becoming excessively large by making the strap 11 to be thin by deploying the adjuster portion 19, the strap 11 does not interfere with a back-to-back portable terminal 83 even in the cradle 149 of the type in which a plurality of portable terminals 83 are set back to back, and charging can be performed without any problem.

In the strap 11, a plurality of types of batteries having different distances perpendicular to the terminal rear surface 91 can be attached to the terminal central portion of the terminal rear surface 91. The first mounting portion 125 to which the first electronic device (gadget) can be attached is provided in a part of the periphery of the battery on the terminal rear surface. The base 13 is disposed in the terminal central portion.

In the strap 11, the plurality of types of batteries having different distances perpendicular to the terminal rear surface 91 are attached to the terminal central portion of the terminal rear surface 91. The first mounting portion 125 to which the gadget can be attached is provided in a part of the periphery of the battery. Here, the "periphery" is a closed curve or a broken line surrounding the battery. The "periphery of the battery" is around the battery. The term "around the battery" refers to an annular region surrounding the battery. Therefore, for example, when a rectangular battery is disposed on the rectangular terminal rear surface 91, the annular region is a square frame-shaped region around the battery.

The gadget, which is the optional device, is mounted on the first mounting portion 125 provided in the periphery of the base 13 on the terminal rear surface 91. The rotary plate 15 and the holding portion 17 rotate substantially inside an outer shape of the base. On the other hand, when the gadget disposed in the periphery of the base 13 largely projects from the terminal rear surface 91, the finger 33 projecting from the holding portion 17 approaches the optional device while the portable terminal 83 is being rotated in the vertical direction or the horizontal direction.

In the strap 11, when the gadget greatly projects from the terminal rear surface 91 (in other words, when a level difference in thickness between a battery surface and an electronic device surface is large), the adjuster portion 19 is raised in the folded state so that the gadget is prevented from being hit by hand when the portable terminal 83 is rotated, thereby preventing the rotation from being inhibited.

Since the base 13 is attached at a position overlapping the battery of the terminal rear surface 91, when a thick battery (large-capacity battery pack 115) is mounted instead of the thin battery (normal battery pack 113), the terminal rear surface 91 and the base rear surface 37 are separated from each other. In this case, by deploying the adjuster portion 19, the distance between the terminal rear surface 91 and the base rear surface 37 can be reduced, and the strap 11 can be prevented from excessively projecting from the terminal rear surface 91.

As described above, in the strap 11, in the case of a gadget that greatly projects from the terminal rear surface 91, the adjuster portion 19 can be folded to separate the finger 33 and the gadget from each other. In addition, in the case of the gadget that does not project, the thickness projecting from the terminal rear surface 91 can be reduced to a state in which the rotation of the portable terminal 83 in the vertical direction and the horizontal direction is not inhibited by deploying the adjuster portion 19 to eliminate overlapping, and it is possible to prevent the thickness from becoming excessively large.

The adjuster portion 19 includes the belt attachment plate 41 that is fixed to the base rear surface 37, the insertion belt 43 having a long body and that extends from the base 13 and is folded back in the substantially half manner, and overlaps the belt attachment plate 41, and the pair of blade portions 39 that project from both sides of the belt attachment plate 41, and are alternately folded over the insertion belt 43. The insertion belt 43 overlapping the belt attachment plate 41 is disposed between the both sides of the belt attachment plate 41.

In the strap 11, the belt attachment plate 41 serving as a component of the adjuster portion 19 is fixed to the base rear surface 37. The long length insertion belt 43, which extends from the base 13 and serves as the component of the adjuster portion 19, is folded back in the substantially half manner so as to overlap the belt attachment plate 41. The belt attachment plate 41 is formed with a pair of blade portions 39 projecting from both sides sandwiching the insertion belt 43 folded back and overlapping the belt attachment plate 41. The pair of blade portions 39 are alternately folded over the insertion belt 43 overlapping the belt attachment plate 41. Since the adjuster portion 19 has two blade portions 39 on the left and right sides, the adjuster portion 19 can maintain a symmetrical shape on the left, right, upper, and lower sides both at the time of folding and at the time of deploying, with respect to a structure in which a thick member is folded at once.

The adjuster portion 19 can obtain a total of four layers of overlapping thickness of the belt attachment plate 41 on the base rear surface 37, the insertion belt 43 overlapping the belt attachment plate 41, and the pair of blade portions 39 alternately overlapped on the insertion belt 43. By opening the pair of blade portions 39, the overlapping thickness can be reduced by half. The adjuster portion 19 can be easily brought into the deployed state or the folded state, and the thickness of the strap 11 can be easily adjusted without using other members.

In the strap 11, the second mounting portion 131 to which the second electronic device (barcode reader 133) can be attached is provided in another part of the periphery in which one (straight line 127) of two straight lines orthogonal to each other inside the periphery passes through the first mounting portion 125 and the other (straight line 129) passes through the second mounting portion 131. The second electronic device includes the operation unit 147 on the device side surface which is arranged in the circumferential direction of the periphery and the hole portion 145 is provided in a device lower portion of the second electronic device facing the terminal central portion. The insertion belt 43 is inserted into the hole portion 145, folded back, and overlapping the belt attachment plate 41.

In the strap 11, the second mounting portion 131 is provided in another part of the periphery in which one (the straight line 127) of the two straight lines orthogonal to each other inside the periphery of the battery passes through the first mounting portion 125 and the other (the straight line 129) passes through the second mounting portion 131. That is, the second mounting portion 131 is disposed at a position rotated by 90 degrees in the circumferential direction from the position of the first mounting portion 125 on the terminal rear surface 91.

The barcode reader 133 attached to the second mounting portion 131 includes the operation unit 147 on the device side surface which is arranged in the circumferential direction of the periphery, and includes the hole portion 145 in the device lower portion facing the terminal central portion. The insertion belt 43 of the adjuster portion 19 is passed through the hole portion 145. The insertion belt 43 that is passed through the hole portion 145 is folded back to overlap the belt attachment plate 41.

Accordingly, the strap 11 can be attached to the terminal rear surface 91 at one location (one point) through the barcode reader 133 mounted to the terminal rear surface 91 by passing the insertion belt 43 through the hole portion 145 without separately using an attachment string. Since the insertion belt 43 extends linearly from the barcode reader 133 toward the terminal central portion, the insertion belt 43 does not interfere with the operation even if the operation unit 147 such as a button is provided on the device side surface of the barcode reader 133. Therefore, the strap 11 can be attached to the terminal rear surface 91 without deteriorating operability of the barcode reader 133.

The strap 11 is provided with the charging terminal 105 on the terminal side surface of the portable terminal 83, which is on the side opposite to the second mounting portion 131 with respect to the terminal central portion sandwiched therebetween. In the base 13, the base lower corner portions 45 on both sides sandwiching the charging terminal 105 are fixed to the terminal lower corner portions 107 on both sides sandwiching the charging terminal 105 by the buckle-attached belts 47 whose length is adjustable.

In the strap 11, the insertion belt 43 is passed through and fixed to the hole portion 145 of the barcode reader 133. The base lower corner portions 45 on both sides are fixed to the terminal lower corner portions 107 on both sides by using the pair of buckle-attached belts 47. Accordingly, the strap 11 can be fastened to the portable terminal 83 at three points.

In the three-point fastening, the insertion belt 43 is a member constituting a part of the adjuster portion 19. Therefore, the strap 11 can be fastened at one point by using the component of the adjuster portion 19, and the attachment string or the like for attaching the base 13 to the second mounting portion 131 of the terminal rear surface 91 is not necessary.

The length of the buckle-attached belt 47 is variable, whereas the length of the insertion belt 43 is fixed. In the strap 11, when the length of the buckle-attached belt 47 is set at the time of mounting the thin normal battery pack 113, the length of the buckle-attached belt 47 is reset to be long at the time of mounting the thick large-capacity battery pack 115.

Figure 32:
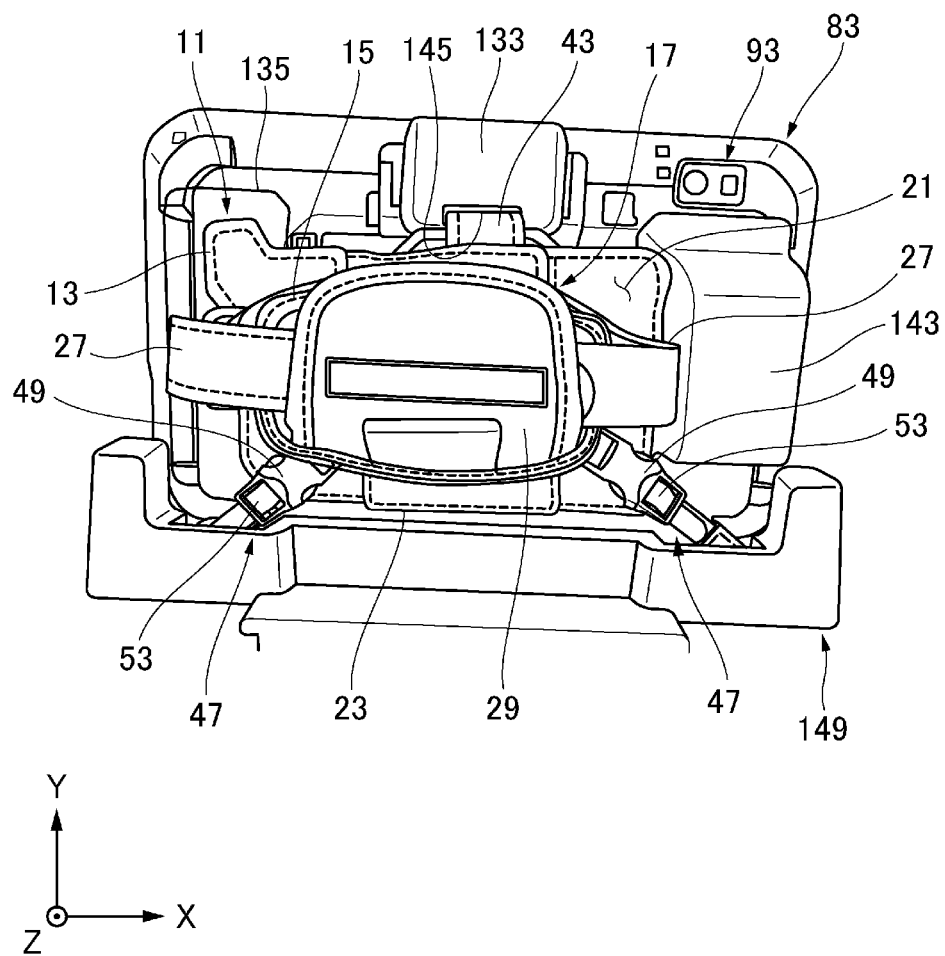
FIG. 32 is a rear view of the portable terminal mounted with the strap and set in the cradle.

FIG. 32 is a rear view of the portable terminal 83 mounted with the strap 11 and set in the cradle 149.

At this time, since the length of the insertion belt 43 fixed to the barcode reader 133 does not change, the strap 11 moves in a direction away from the charging terminal 105. That is, the strap 11 is displaced in the Y direction (that is, upward direction) away from the charging terminal 105 even when the position of the base 13 or the like is displaced due to the replacement of the thin normal battery pack 113 and the thick large-capacity battery pack 115. Accordingly, when the portable terminal 83 is set in the cradle 149, the strap 11 can avoid charging failure of the portable terminal 83 due to interference of the strap 11 with the cradle 149.

The strap 11 is provided with the charging terminal 105 on the terminal side surface of the portable terminal 83 on the side opposite to the second mounting portion 131 with the terminal central portion sandwiched therebetween. In the base 13, the base upper corner portions 69 on both sides sandwiching the barcode reader 133 are fixed to the terminal upper corner portions 109 on both sides sandwiching the barcode reader 133 by the constant-sized first attachment strings 63. The base lower corner portions 45 on both sides sandwiching the charging terminal 105 are fixed to the terminal lower corner portions 107 on both sides sandwiching the charging terminal 105 by the buckle-attached belts 47 whose length is adjustable.

In the strap 11, the base upper corner portions 69 on both sides sandwiching the barcode reader 133 are fixed to the terminal upper corner portions 109 on both sides by using the pair of constant-sized first attachment strings 63. Then, the base lower corner portions 45 on both sides sandwiching the charging terminal 105 are fixed to the terminal lower corner portions 107 on both sides by using the pair of buckle-attached belts 47. Accordingly, the strap 11 can be fastened to the portable terminal 83 at four points.

Also in this case, the length of the buckle-attached belt 47 is variable, and the length of the first attachment string 63 is fixed. In the strap 11, when the length of the buckle-attached belt 47 is set at the time of mounting the thin normal battery pack 113, the length of the buckle-attached belt 47 is reset to be long at the time of mounting the thick large-capacity battery pack 115.

At this time, the strap 11 is displaced in a direction away from the charging terminal 105 since the length of the first attachment string 63 fixed to the terminal upper corner portion 109 does not change. That is, the strap 11 is displaced in the direction away from the charging terminal 105 even when the strap 11 is displaced due to the replacement of the thin normal battery pack 113 and the thick large-capacity battery pack 115. Accordingly, in the same manner as described above, the strap 11 can avoid the charging failure of the portable terminal 83 due to the interference of the strap 11 with the cradle 149 to which the charging terminal 105 is connected.

The base 13 includes the accommodation portion 67 that accommodates the first attachment string 63.

In the strap 11, when the first attachment string 63 is not in use, that is, when the insertion belt 43 is in use, the first attachment string 63 is accommodated in the accommodation portion 67 of the base 13. During carrying, the strap 11 can be made compact, and the portability can be improved. Since the first attachment string 63 can always be stored integrally with the strap 11, it is possible to prevent the first attachment string 63 from being lost.

The buckle-attached belt 47 includes the female buckle 49 and the male buckle 51 that can be coupled to and decoupled from the female buckle 49 and includes the length adjustment portion 53. The female buckle 49 is connected to the base 13. The male buckle 51 is connected to the portable terminal 83.

In the strap 11, the buckle-attached belt 47 is integrally formed by coupling the female buckle 49 and the male buckle 51. The buckle-attached belt 47 can be divided into two by releasing the coupling between the female buckle 49 and the male buckle 51. Here, the female buckle 49 is connected to the base 13, and the male buckle 51 including the length adjustment portion 53 is connected to the portable terminal 83. The buckle-attached belt 47 couples, by coupling the female buckle 49 and the male buckle 51, the base lower corner portion 45 to which the female buckle 49 is connected and the terminal lower corner portion 107 to which the male buckle 51 is connected.

In the buckle-attached belt 47, the male buckle 51 is disposed at a position close to the terminal lower corner portion 107 in a state in which the base lower corner portion 45 and the terminal lower corner portion 107 are connected to each other. Accordingly, loosening of the male buckle 51 can be adjusted by pulling the belt extra length portion 55 in a direction away from the base 13 of the strap 11, that is, outward.

Accordingly, in the strap 11, the loosening can be adjusted by pulling the belt extra length portion 55 outward. Therefore, it is not necessary to secure a space for pulling the belt extra length portion 55 inward. In other words, the base 13, the rotary plate 15, and the holding portion 17 do not interfere with the belt extra length portion 55 pulled inward. As a result, the strap 11 can secure a wide rotation space for the rotary plate 15 inside, and smooth rotation of the rotary plate 15 can be implemented. Since the belt extra length portion 55 is pulled outward, for example, a large number of optional devices can be disposed on the terminal rear surface 91, even when a belt adjustment space cannot be secured in the terminal central portion, the operability of belt adjustment can be maintained, and loosening adjustment can be easily performed.

The second attachment string 77 is attached to the female buckle 49. The female buckle 49 is disposed on the base front surface 21 by inserting the second attachment string 77 into the through hole 61 formed in the base 13 and fixing the second attachment string 77 to the base rear surface 37.

In the strap 11, since the female buckle 49 is attached to the base 13 by the second attachment string 77 as compared with a case where the female buckle 49 is attached to the base 13 by the belt, it is possible to increase a degree of freedom of a movement of the female buckle 49. Therefore, when the portable terminal 83 is rotated, a load applied to the buckle by a reaction force from the base 13 can be reduced, and the female buckle 49 and the male buckle 51 can be prevented from being disengaged from each other by an unintended external force.

In order to ensure the degree of freedom of the movement of the female buckle 49 by the belt, it is necessary to dispose the female buckle 49 at a position sufficiently distant from the through hole 61. On the other hand, when the second attachment string 77 is used, the distance from the through hole 61 can be minimized, and a compact configuration for the portable terminal can be implemented.

In the strap 11, a plurality of attachment elements 75 to which the external support member 13 can be attached are fixed to the base rear surface 37.

In the strap 11, since the adjuster portion 19 is provided on the base rear surface 37, a gap is generated between the terminal rear surface 91 and the base rear surface 37. Therefore, a space for providing the attachment element 75 can be secured, and the attachment element 75 can be installed on the base rear surface 37. Accordingly, it is possible to support the portable terminal 83 via the strap 11 by the external support member while preventing bending of the base 13 to the gap and making the rotation of the rotary plate 15 on the base front surface 21 smooth.

The plurality of attachment elements 75 to which the external support member supporting the base 13 can be attached are fixed to the base rear surface 37, and the second attachment string 77 is fixed to the attachment elements 75.

In the strap 11, the second attachment string 77 connected to the female buckle 49 disposed on the base front surface 21 is fixed to the attachment element 75 provided on the base rear surface 37 through the through hole 61 in order to attach the external support member. Accordingly, the second attachment string 77 connected to the female buckle 49 can be fixed at the same time as the fixing of the attachment element 75, and an increase in the number of fixing components can be prevented.

Therefore, according to the strap 11 according to the embodiment, even when various electronic components are attached to the terminal rear surface 91, it is possible to prevent the rotation of the portable terminal 83 in the vertical direction and the horizontal direction from being inhibited, and it is possible to prevent the thickness of the strap 11 from becoming excessively large.

The present disclosure is useful for a strap or the like capable of preventing the rotation of the portable terminal in the vertical direction and the horizontal direction from being inhibited and preventing the thickness of the strap from becoming excessively large even when various electronic components are attached to the terminal rear surface.

What is claimed is:

1. A strap comprising:
    a base having a plate shape and detachably attached along a terminal rear surface on a side opposite to a terminal front surface on which a display of a portable terminal is provided;
    a rotary plate attached to a base front surface on a side opposite to a base rear surface of the base facing the terminal rear surface so as to be rotatable around a rotation axis perpendicular to the base front surface;
    an annular holding portion fixed to a rotary plate front surface on a side opposite to a rotary plate rear surface of the rotary plate facing the base front surface and into which a palm portion can be inserted; and
    an adjuster portion having a foldable portion and fixed to the base rear surface of the base, and the foldable portion varies a distance between the base and the terminal rear surface perpendicular to the base rear surface from the base rear surface of the base.

2. The strap according to claim 1,
    further comprising a fastener such that a plurality of types of batteries having different length perpendicular to the terminal rear surface can be attached to a terminal central portion of the terminal rear surface,
    wherein a first mounting portion to which a first electronic device can be attached is provided in a part of a periphery of the battery on the terminal rear surface, and
    wherein the base is disposed in the terminal central portion.

3. The strap according to claim 1,
    wherein the adjuster portion includes:
        a belt attachment plate fixed to the base rear surface,
        an insertion belt having a long body and that extends from the base and is folded substantially in half so as to overlap the belt attachment plate, and
        a pair of blade portions projecting from both sides of the belt attachment plate and alternately folded on the insertion belt, wherein the insertion belt overlapping the belt attachment plate is disposed between the both sides of the belt attachment plate.

4. The strap according to claim 3,
    wherein a second mounting portion to which a second electronic device can be attached is provided in another part of a periphery of a battery in which one of two straight lines orthogonal to each other inside the periphery of the battery passes through a first mounting portion to which a first electronic device can be attached and the other of the two straight lines passes through the second mounting portion,
    wherein the second electronic device includes an operation unit on a device side surface which is arranged in a circumferential direction of the periphery, and a hole portion is provided in a device lower portion of the second electronic device facing the terminal central portion of the terminal rear surface, and
    wherein the insertion belt is inserted into the hole portion and is folded back to overlap the belt attachment plate.

5. The strap according to claim 4,
    wherein a charging terminal is provided on a terminal side surface of the portable terminal on a side opposite to the second mounting portion with respect to the terminal central portion, and
    wherein base lower corner portions on both sides of the base which sandwich the charging terminal are fixed to terminal lower corner portions on both sides of the portable terminal which sandwich the charging terminal by buckle-attached belts whose length is adjustable.

6. The strap according to claim 3,
    wherein a charging terminal is provided on a terminal side surface of the portable terminal on a side opposite to the second mounting portion to which a second electronic device can be attached with respect to the terminal central portion on the terminal rear surface sandwiched therebetween, and
    wherein base upper corner portions on both sides of the base which sandwich the second electronic device are fixed to terminal upper corner portions on both sides of the portable terminal which sandwich the second electronic device by constant-sized first attachment strings, and base lower corner portions on both sides of the base which sandwich the charging terminal are fixed to terminal lower corner portions on both sides of the portable terminal which sandwich the charging terminal by buckle-attached belts whose length is adjustable.

7. The strap according to claim 6,
    wherein the base includes an accommodation portion that accommodates the first attachment string.

8. The strap according to claim 5,
    wherein the buckle-attached belt includes:
        a female buckle, and
        a male buckle that can be coupled to and decoupled from the female buckle and that is provided with a length adjustment portion, and
    wherein the female buckle is connected to the base, and the male buckle is connected to the portable terminal.

9. The strap according to claim 6,
wherein the buckle-attached belt includes:
- a female buckle, and
- a male buckle that can be coupled to and decoupled from the female buckle and that is provided with a length adjustment portion, and wherein the female buckle is connected to the base, and the male buckle is connected to the portable terminal.

10. The strap according to claim 8,
wherein a second attachment string is attached to the female buckle, and
wherein the female buckle is disposed on the base front surface by inserting the second attachment string into a through hole formed in the base and fixing the second attachment string to the base rear surface.

11. The strap according to claim 9,
wherein a second attachment string is attached to the female buckle, and
wherein the female buckle is disposed on the base front surface by inserting the second attachment string into a through hole formed in the base and fixing the second attachment string to the base rear surface.

12. The strap according to claim 1,
wherein a plurality of attachment elements to which an external support member supporting the base can be attached are fixed to the base rear surface.

13. The strap according to claim 10,
wherein a plurality of attachment elements to which an external support member supporting the base can be attached are fixed to the base rear surface, and
wherein the second attachment string is fixed to the attachment elements.

14. The strap according to claim 11,
wherein a plurality of attachment elements to which an external support member supporting the base can be attached are fixed to the base rear surface, and
wherein the second attachment string is fixed to the attachment elements.

* * * * *